US009920960B2

(12) United States Patent
Gerber et al.

(10) Patent No.: US 9,920,960 B2
(45) Date of Patent: Mar. 20, 2018

(54) HEAT PUMP SYSTEM HAVING A PRE-PROCESSING MODULE

(75) Inventors: Manfred Gerber, Saskatoon (CA); Can Wen Rong, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 829 days.

(21) Appl. No.: 13/350,902

(22) Filed: Jan. 16, 2012

(65) Prior Publication Data

US 2012/0180505 A1    Jul. 19, 2012

Related U.S. Application Data

(63) Continuation of application No. 13/009,222, filed on Jan. 19, 2011, now Pat. No. 8,915,092.

(51) Int. Cl.
*F25D 21/12* (2006.01)
*F25B 13/00* (2006.01)
(Continued)

(52) U.S. Cl.
CPC ............... *F25B 13/00* (2013.01); *F24D 5/12* (2013.01); *F24D 19/0095* (2013.01);
(Continued)

(58) Field of Classification Search
CPC .. F24F 12/00; F24F 2011/0087; F24F 12/003; F24F 13/10; F25B 2400/04
(Continued)

(56) References Cited

U.S. PATENT DOCUMENTS

| 1,015,831 A | 1/1912 | Pielock et al. |
| 2,186,844 A | 1/1940 | Smith |

(Continued)

FOREIGN PATENT DOCUMENTS

| AU | 2011286700 A1 | 12/2012 |
| CA | 2283089 A1 | 11/2000 |

(Continued)

OTHER PUBLICATIONS

International Preliminary Report on Patentability for PCT/CA2012/000055, mailed Aug. 1, 2013.
(Continued)

*Primary Examiner* — Elizabeth Martin
(74) *Attorney, Agent, or Firm* — Schwegman Lundberg & Woessner, P.A.

(57) ABSTRACT

A heat pump system may be selectively operated in a defrost mode or cycle. The system includes an energy recovery module that receives and conditions air in a regeneration air channel. A pre-processing module is positioned downstream of the energy recovery module. The pre-processing module receives and heats air from the energy recovery module. A regeneration air heat exchanger is positioned downstream of the pre-processing module. The regeneration air heat exchanger receives and conditions air from the pre-processing module. The pre-processing module heats the air from the energy recovery module to increase an efficiency of the regeneration air heat exchanger. During the defrost mode, a loop of regeneration air may be recirculated between the supply air channel and the regeneration air channel in order to defrost the regeneration air heat exchanger.

17 Claims, 8 Drawing Sheets

(51) Int. Cl.
*F24D 5/12* (2006.01)
*F24F 12/00* (2006.01)
*F24D 19/00* (2006.01)
*F24F 11/00* (2018.01)
*F25B 40/04* (2006.01)

(52) U.S. Cl.
CPC ............ *F24F 12/00* (2013.01); *F24F 12/003* (2013.01); *F24F 2011/0087* (2013.01); *F24F 2011/0089* (2013.01); *F25B 40/04* (2013.01); *F25B 2313/021* (2013.01); *F25B 2313/02741* (2013.01); *F25B 2400/0405* (2013.01); *F25B 2600/2501* (2013.01); *F25B 2600/2517* (2013.01); *Y02B 30/126* (2013.01); *Y02B 30/52* (2013.01); *Y02B 30/563* (2013.01)

(58) Field of Classification Search
USPC .......................... 62/80, 151, 282, 324.5, 272
See application file for complete search history.

(56) References Cited

U.S. PATENT DOCUMENTS

| | | |
|---|---|---|
| 2,290,465 A | 7/1942 | Crawford et al. |
| 2,562,811 A | 7/1951 | Glenn |
| 2,946,201 A | 7/1960 | Munters |
| 2,968,165 A | 1/1961 | Gunnar |
| 3,009,684 A | 1/1961 | Georg |
| 3,018,231 A | 1/1962 | Valentine et al. |
| 3,247,679 A | 4/1966 | Gershon |
| 3,291,206 A | 12/1966 | Peter |
| 3,401,530 A | 9/1968 | Gershon |
| 3,467,072 A | 9/1969 | Toesca |
| 3,735,559 A | 5/1973 | Salemme |
| 4,113,004 A | 9/1978 | Rush et al. |
| 4,180,985 A | 1/1980 | Northrup, Jr. |
| 4,233,796 A | 11/1980 | Mazzoni et al. |
| 4,235,081 A | 11/1980 | Dowling |
| 4,474,021 A | 10/1984 | Harband |
| 4,538,426 A | 9/1985 | Bock |
| 4,594,860 A | 6/1986 | Coellner et al. |
| 4,719,761 A | 1/1988 | Cromer |
| 4,729,428 A | 3/1988 | Yasutake et al. |
| 4,729,774 A | 3/1988 | Cohen et al. |
| 4,841,733 A | 6/1989 | Dussault et al. |
| 4,887,438 A | 12/1989 | Meckler |
| 4,905,479 A | 3/1990 | Wilkinson |
| 4,909,810 A | 3/1990 | Nakao et al. |
| 4,936,107 A | 6/1990 | Kitagaki et al. |
| 4,941,324 A | 7/1990 | Peterson et al. |
| 4,982,575 A | 1/1991 | Besik |
| 5,003,961 A | 4/1991 | Besik |
| 5,020,334 A | 6/1991 | Wilkinson |
| 5,022,241 A | 6/1991 | Wilkinson |
| 5,120,445 A | 6/1992 | Colman |
| 5,148,374 A | 9/1992 | Coellner |
| 5,170,633 A | 12/1992 | Kaplan |
| 5,176,005 A | 1/1993 | Kaplan |
| 5,181,387 A | 1/1993 | Meckler |
| 5,191,771 A | 3/1993 | Meckler |
| 5,297,398 A | 3/1994 | Meckler |
| 5,311,929 A | 5/1994 | Verret |
| 5,325,676 A | 7/1994 | Meckler |
| 5,337,574 A * | 8/1994 | Dick ................................ 62/89 |
| 5,351,497 A | 10/1994 | Lowenstein |
| 5,353,606 A | 10/1994 | Yoho et al. |
| 5,373,704 A | 12/1994 | Mcfadden |
| 5,387,376 A | 2/1995 | Gasser |
| 5,448,895 A | 9/1995 | Coellner et al. |
| 5,471,852 A | 12/1995 | Meckler |
| 5,482,625 A | 1/1996 | Shimizu et al. |
| 5,496,397 A | 3/1996 | Fischer et al. |
| 5,502,975 A | 4/1996 | Brickley et al. |
| 5,517,828 A | 5/1996 | Calton et al. |
| 5,526,651 A | 6/1996 | Worek et al. |
| 5,542,968 A | 8/1996 | Belding |
| 5,551,245 A | 9/1996 | Calton et al. |
| 5,564,281 A | 10/1996 | Calton et al. |
| 5,579,647 A | 12/1996 | Calton et al. |
| 5,580,369 A | 12/1996 | Belding |
| 5,632,954 A | 5/1997 | Coellner et al. |
| 5,638,900 A | 6/1997 | Lowenstein |
| 5,649,428 A | 7/1997 | Calton et al. |
| 5,650,221 A | 7/1997 | Belding |
| 5,660,048 A | 8/1997 | Belding |
| 5,685,897 A | 11/1997 | Belding |
| 5,701,762 A | 12/1997 | Akamatsu et al. |
| 5,718,286 A | 2/1998 | Damsohn et al. |
| 5,727,394 A | 3/1998 | Belding |
| 5,749,230 A | 5/1998 | Coellner et al. |
| 5,758,508 A | 6/1998 | Belding |
| 5,758,511 A | 6/1998 | Yoho et al. |
| 5,761,915 A | 6/1998 | Rao |
| 5,761,923 A | 6/1998 | Maeda |
| 5,791,153 A | 8/1998 | Belding |
| 5,791,157 A | 8/1998 | Maeda |
| 5,816,065 A | 10/1998 | Maeda |
| 5,825,641 A | 10/1998 | Mangtani |
| 5,826,434 A | 10/1998 | Belding |
| 5,832,736 A | 11/1998 | Yoshioka et al. |
| 5,860,284 A | 1/1999 | Goland |
| 5,890,372 A | 4/1999 | Belding |
| 5,911,273 A | 6/1999 | Brenner et al. |
| 5,931,016 A | 8/1999 | Yoho |
| 5,943,874 A | 8/1999 | Maeda |
| 5,946,931 A | 9/1999 | Lomax et al. |
| 5,992,160 A | 11/1999 | Bussjager et al. |
| 6,003,327 A | 12/1999 | Belding |
| 6,018,953 A | 2/2000 | Belding |
| 6,029,462 A | 2/2000 | Denniston |
| 6,029,467 A | 2/2000 | Moratalla |
| 6,050,100 A | 4/2000 | Belding |
| 6,079,481 A | 6/2000 | Lowenstein |
| 6,094,835 A | 8/2000 | Cromer |
| 6,138,470 A | 10/2000 | Potnis et al. |
| 6,141,979 A | 11/2000 | Dunlap |
| 6,145,588 A | 11/2000 | Martin et al. |
| 6,176,101 B1 | 1/2001 | Lowenstein |
| 6,178,762 B1 | 1/2001 | Flax |
| 6,199,388 B1 | 3/2001 | Fischer |
| 6,199,392 B1 * | 3/2001 | Maeda ........................... 62/180 |
| 6,237,354 B1 | 5/2001 | Cromer |
| 6,247,323 B1 | 6/2001 | Maeda |
| 6,269,650 B1 | 8/2001 | Shaw |
| 6,318,106 B1 | 11/2001 | Maeda |
| RE37,464 E | 12/2001 | Meckler |
| 6,363,218 B1 | 3/2002 | Lowenstein |
| 6,412,295 B2 | 7/2002 | Weiss et al. |
| 6,442,951 B1 | 9/2002 | Maeda et al. |
| 6,494,053 B1 | 12/2002 | Forkosh |
| 6,497,107 B2 | 12/2002 | Maisotsenko et al. |
| 6,532,763 B1 | 3/2003 | Gupte |
| 6,546,746 B2 | 4/2003 | Forkosh et al. |
| 6,568,466 B2 | 5/2003 | Lowenstein |
| 6,575,228 B1 | 6/2003 | Ragland et al. |
| 6,598,862 B2 | 7/2003 | Merrill et al. |
| 6,635,104 B2 | 10/2003 | Komkova et al. |
| 6,644,059 B2 | 11/2003 | Maeda et al. |
| 6,684,649 B1 | 2/2004 | Thompson |
| 6,709,492 B1 | 3/2004 | Spadaccini et al. |
| 6,720,990 B1 | 4/2004 | Walker et al. |
| 6,739,142 B2 | 5/2004 | Korin |
| 6,745,826 B2 | 6/2004 | Lowenstein |
| 6,751,964 B2 | 6/2004 | Fischer |
| 6,841,601 B2 | 1/2005 | Serpico et al. |
| 6,848,265 B2 | 2/2005 | Lowenstein |
| 6,854,278 B2 | 2/2005 | Maisotsenko et al. |
| 6,864,005 B2 | 3/2005 | Mossman |
| 6,918,263 B2 | 7/2005 | Lee et al. |
| 6,935,416 B1 | 8/2005 | Tsunoda et al. |
| 6,973,795 B1 | 12/2005 | Moffitt |
| 6,976,365 B2 | 12/2005 | Forkosh et al. |
| 6,978,633 B2 | 12/2005 | Yamazaki |
| 7,000,427 B2 | 2/2006 | Mathias et al. |

(56) References Cited

U.S. PATENT DOCUMENTS

| | | | |
|---|---|---|---|
| 7,013,655 B2 | 3/2006 | Des Champs | |
| 7,017,356 B2 | 3/2006 | Moffitt | |
| 7,092,006 B2 | 8/2006 | Walker et al. | |
| 7,093,452 B2 | 8/2006 | Chee et al. | |
| 7,093,649 B2 | 8/2006 | Dawson | |
| RE39,288 E | 9/2006 | Assaf | |
| 7,737,224 B2 | 1/2007 | Willis et al. | |
| 7,178,355 B2 | 2/2007 | Moffitt | |
| 7,181,918 B2 | 2/2007 | Reinders et al. | |
| 7,231,967 B2 * | 6/2007 | Haglid | 165/231 |
| 7,269,966 B2 | 9/2007 | Lowenstein | |
| 7,306,650 B2 | 12/2007 | Slayzak | |
| 7,331,376 B2 | 2/2008 | Gagnon et al. | |
| 7,340,906 B2 | 3/2008 | Moffitt | |
| 7,389,646 B2 | 6/2008 | Moffitt | |
| 7,389,652 B1 | 6/2008 | Fair | |
| 7,593,033 B2 | 9/2009 | Walker et al. | |
| 7,602,414 B2 | 10/2009 | Walker et al. | |
| 7,605,840 B2 | 10/2009 | Walker et al. | |
| 7,717,404 B2 | 5/2010 | Hasegawa et al. | |
| 7,719,565 B2 | 5/2010 | Walker et al. | |
| 7,753,991 B2 | 7/2010 | Kertzman | |
| 7,781,034 B2 | 8/2010 | Yializis et al. | |
| 7,817,182 B2 | 10/2010 | Walker et al. | |
| 7,942,387 B2 | 5/2011 | Forkosh | |
| 7,966,841 B2 | 6/2011 | Lowenstein | |
| 8,002,023 B2 | 8/2011 | Murayama | |
| 8,033,532 B2 | 10/2011 | Yabu | |
| 8,137,436 B2 | 3/2012 | Calis et al. | |
| 8,157,891 B2 | 4/2012 | Montie et al. | |
| 8,318,824 B2 | 11/2012 | Matsuoka et al. | |
| 8,550,151 B2 | 10/2013 | Murayama et al. | |
| 8,769,971 B2 | 7/2014 | Kozubal et al. | |
| 8,783,053 B2 | 7/2014 | McCann | |
| 8,887,523 B2 | 11/2014 | Gommed et al. | |
| 8,915,092 B2 | 12/2014 | Gerber et al. | |
| 8,920,699 B2 | 12/2014 | Marutani et al. | |
| 8,943,848 B2 | 2/2015 | Phannavong et al. | |
| 8,966,924 B2 | 3/2015 | Pichai | |
| 9,027,764 B2 | 5/2015 | Marutani et al. | |
| 9,109,808 B2 | 8/2015 | Gerber et al. | |
| 9,188,349 B2 | 11/2015 | Warmerdam et al. | |
| 9,234,665 B2 | 1/2016 | Erb et al. | |
| 9,243,810 B2 | 1/2016 | Vandermeulen et al. | |
| 9,273,877 B2 | 3/2016 | Vandermeulen | |
| 9,429,332 B2 | 8/2016 | Vandermeulen et al. | |
| 9,772,124 B2 | 9/2017 | Wintemute et al. | |
| 2001/0003902 A1 | 6/2001 | Kopko | |
| 2002/0038552 A1 | 4/2002 | Maisotsenko | |
| 2003/0014983 A1 | 1/2003 | Maisotsenko et al. | |
| 2003/0037905 A1 | 2/2003 | Weng | |
| 2003/0070787 A1 | 4/2003 | Moffitt | |
| 2004/0000152 A1 | 1/2004 | Fischer | |
| 2004/0061245 A1 | 4/2004 | Maisotsenko et al. | |
| 2004/0134211 A1 | 7/2004 | Lee et al. | |
| 2004/0134212 A1 | 7/2004 | Lee et al. | |
| 2004/0168462 A1 | 9/2004 | Assaf | |
| 2004/0226685 A1 | 11/2004 | Gagnon et al. | |
| 2005/0056042 A1 | 3/2005 | Bourne et al. | |
| 2005/0072303 A1 | 4/2005 | Weidenmann | |
| 2005/0230080 A1 | 10/2005 | Paul et al. | |
| 2005/0249901 A1 | 11/2005 | Yializis et al. | |
| 2005/0262862 A1 | 12/2005 | Moffitt | |
| 2006/0021615 A1 | 2/2006 | Kertzman | |
| 2006/0042295 A1 | 3/2006 | Assaf | |
| 2006/0205301 A1 | 9/2006 | Klare et al. | |
| 2007/0029685 A1 | 2/2007 | Lin | |
| 2007/0056894 A1 | 3/2007 | Connors | |
| 2007/0095519 A1 | 5/2007 | Hombucher | |
| 2007/0234743 A1 | 10/2007 | Assaf | |
| 2007/0279861 A1 | 12/2007 | Doll et al. | |
| 2008/0023182 A1 | 1/2008 | Beamer et al. | |
| 2008/0085437 A1 | 4/2008 | Dean et al. | |
| 2008/0099184 A1 | 5/2008 | Han | |
| 2008/0283217 A1 | 11/2008 | Gagnon et al. | |
| 2009/0095162 A1 | 4/2009 | Hargis et al. | |
| 2009/0126913 A1 | 5/2009 | Lee et al. | |
| 2009/0133866 A1 | 5/2009 | Campbell et al. | |
| 2009/0193974 A1 | 8/2009 | Montie et al. | |
| 2009/0294110 A1 | 12/2009 | Foust | |
| 2009/0324929 A1 | 12/2009 | Yamakawa et al. | |
| 2010/0170655 A1 | 7/2010 | Kronvall | |
| 2010/0170776 A1 | 7/2010 | Ehrenberg et al. | |
| 2010/0192605 A1 | 8/2010 | Fang et al. | |
| 2010/0200068 A1 | 8/2010 | D'Arcy et al. | |
| 2010/0275629 A1 | 11/2010 | Erickson | |
| 2010/0300123 A1 | 12/2010 | Park et al. | |
| 2010/0319370 A1 | 12/2010 | Kozubal | |
| 2011/0056384 A1 | 3/2011 | Kadota | |
| 2011/0192579 A1 | 8/2011 | Sotokawa et al. | |
| 2011/0223486 A1 | 9/2011 | Zhang et al. | |
| 2011/0232485 A1 | 9/2011 | Ellsworth | |
| 2011/0232633 A1 | 9/2011 | Lima | |
| 2011/0308265 A1 | 12/2011 | Phannavong | |
| 2012/0061045 A1 | 3/2012 | Huizing | |
| 2012/0085112 A1 | 4/2012 | Wintemute | |
| 2012/0106073 A1 | 5/2012 | Wu et al. | |
| 2012/0125020 A1 | 5/2012 | Vandermeulen | |
| 2012/0125021 A1 | 5/2012 | Vandermeulen | |
| 2012/0125023 A1 | 5/2012 | Kopko et al. | |
| 2012/0125031 A1 | 5/2012 | Vandermeulen | |
| 2012/0125405 A1 | 5/2012 | Vandermeulen | |
| 2012/0125581 A1 | 5/2012 | Allen | |
| 2012/0131934 A1 | 5/2012 | Vandermeulen | |
| 2012/0131937 A1 | 5/2012 | Vandermeulen | |
| 2012/0131938 A1 | 5/2012 | Vandermeulen | |
| 2012/0131939 A1 | 5/2012 | Vandermeulen | |
| 2012/0131940 A1 | 5/2012 | Vandermeulen | |
| 2012/0132513 A1 | 5/2012 | Vandermeulen | |
| 2012/0162918 A1 | 6/2012 | Thyni et al. | |
| 2012/0168369 A1 | 7/2012 | Van Medevoort et al. | |
| 2012/0186281 A1 | 7/2012 | Vandermeulen | |
| 2012/0247132 A1 | 10/2012 | Lakdawala et al. | |
| 2012/0298340 A1 | 11/2012 | Al-Otaibi | |
| 2013/0056177 A1 | 3/2013 | Coutu et al. | |
| 2013/0186121 A1 | 7/2013 | Erb et al. | |
| 2013/0199220 A1 | 8/2013 | Ma et al. | |
| 2013/0240438 A1 | 9/2013 | Willis et al. | |
| 2013/0248147 A1 | 9/2013 | Wintemute et al. | |
| 2013/0340449 A1 | 12/2013 | Kozubal et al. | |
| 2014/0054004 A1 | 2/2014 | LePoudre et al. | |
| 2014/0054013 A1 | 2/2014 | Lepoudre et al. | |
| 2014/0190037 A1 | 7/2014 | Erb et al. | |
| 2014/0245769 A1 | 9/2014 | Vandermeulen et al. | |
| 2014/0260367 A1 | 9/2014 | Coutu et al. | |
| 2014/0260369 A1 | 9/2014 | Lepoudre et al. | |
| 2014/0260399 A1 | 9/2014 | Vandermeulen | |
| 2014/0262125 A1 | 9/2014 | Erb et al. | |
| 2014/0262144 A1 | 9/2014 | Erb et al. | |
| 2014/0326433 A1 | 11/2014 | Kozubal | |
| 2015/0096714 A1 | 4/2015 | Dagley | |
| 2015/0184876 A1 | 7/2015 | Vandermeulen et al. | |
| 2015/0292754 A1 | 10/2015 | Mongar | |
| 2015/0323203 A1 | 11/2015 | Gerber et al. | |
| 2016/0054012 A1 | 2/2016 | Lepoudre et al. | |
| 2016/0084512 A1 | 3/2016 | Erb et al. | |
| 2016/0187010 A1 | 6/2016 | Vandermeulen | |
| 2016/0290666 A1 | 10/2016 | Coutu et al. | |
| 2016/0327345 A1 | 11/2016 | Lowenstein | |

FOREIGN PATENT DOCUMENTS

| | | | |
|---|---|---|---|
| CA | 2798928 | A1 | 2/2012 |
| CH | 193732 | A | 10/1937 |
| CN | 1163389 | A | 10/1997 |
| CN | 1343292 | A | 4/2002 |
| CN | 1456855 | A | 11/2003 |
| CN | 1517610 | A | 8/2004 |
| CN | 1518477 | A | 8/2004 |
| CN | 1666081 | A | 9/2005 |
| CN | 200958820 | Y | 10/2007 |
| CN | 101405559 | A | 4/2009 |
| CN | 101421580 | A | 4/2009 |
| CN | 101469090 | A | 7/2009 |

(56) References Cited

FOREIGN PATENT DOCUMENTS

| | | |
|---|---|---|
| CN | 101701739 A | 5/2010 |
| CN | 101900378 A | 12/2010 |
| CN | 201906567 U | 7/2011 |
| CN | 102165268 A | 8/2011 |
| CN | 102232015 A | 11/2011 |
| CN | 102395419 A | 3/2012 |
| CN | 102548727 A | 7/2012 |
| CN | 102549361 A | 7/2012 |
| CN | 102933931 A | 2/2013 |
| CN | 103827595 A | 5/2014 |
| CN | 104583706 A | 4/2015 |
| CN | 105121989 A | 12/2015 |
| CN | 105164474 A | 12/2015 |
| CN | 105202795 A | 12/2015 |
| CN | 105283715 A | 1/2016 |
| CN | 101512238 A | 8/2016 |
| DE | 10143092 A1 | 3/2003 |
| EP | 0448991 A2 | 10/1991 |
| EP | 0661502 A2 | 7/1995 |
| EP | 1108575 A1 | 6/2001 |
| EP | 2397787 | 12/2011 |
| GB | 1354502 A | 6/1974 |
| GB | 2015384 | 9/1979 |
| JP | 61-52594 A | 3/1986 |
| JP | 05-157282 A | 6/1993 |
| JP | 07310964 A | 11/1995 |
| JP | 09-196482 A | 7/1997 |
| JP | 10-170177 A | 6/1998 |
| JP | 2004-257588 A | 9/2004 |
| JP | 2006308241 A | 11/2006 |
| JP | 2006336999 A | 12/2006 |
| JP | 2008-070046 A | 3/2008 |
| JP | 2008304150 A | 12/2008 |
| JP | 2009-275955 A | 11/2009 |
| TW | 1271499 B | 1/2007 |
| WO | WO-1996041107 A1 | 12/1996 |
| WO | WO-1999014535 A1 | 3/1999 |
| WO | WO-0135039 A1 | 5/2001 |
| WO | WO-0171260 A1 | 9/2001 |
| WO | WO-03049835 A1 | 6/2003 |
| WO | WO-2004065875 A1 | 8/2004 |
| WO | WO-2008037079 A1 | 4/2008 |
| WO | WO-2008053367 A2 | 5/2008 |
| WO | WO-2008089484 A1 | 7/2008 |
| WO | WO-2009000974 A1 | 12/2008 |
| WO | WO-2009094032 A1 | 7/2009 |
| WO | WO-2009158030 A1 | 12/2009 |
| WO | WO-2011062808 A1 | 5/2011 |
| WO | WO-2011161547 A3 | 12/2011 |
| WO | WO-2012018089 A1 | 2/2012 |
| WO | WO-2012042553 A1 | 4/2012 |
| WO | WO-2012087273 A1 | 6/2012 |
| WO | WO-2012097445 A1 | 7/2012 |
| WO | WO-2013029148 A1 | 3/2013 |
| WO | WO-2013094206 A1 | 6/2013 |
| WO | WO-2013107554 A1 | 7/2013 |
| WO | WO-2013192397 A1 | 12/2013 |
| WO | WO-2014029003 A1 | 2/2014 |
| WO | WO-2014029004 | 2/2014 |
| WO | WO-2014107790 | 7/2014 |
| WO | WO-2014138846 | 9/2014 |
| WO | WO-2014138847 A1 | 9/2014 |
| WO | WO-2014138859 | 9/2014 |
| WO | WO-2014138860 | 9/2014 |
| WO | WO-2016026042 A1 | 2/2016 |

OTHER PUBLICATIONS

International Search Report and Written Opinion for counterpart PCT/CA2012/00055, mailed May 24, 2012.
AAONAIRE Energy Recovery Units Users Information Manual.
"Performance analysis of a liquid desiccant and membrane contactor hybrid air-conditioning system," Bergero, Chiari, Energy and Buildings, 2010.
"AAONAIRE® Energy Recovery Units Users Information Manual", R86610 (Rev. A 8-06), (Aug. 2006), 16 pgs.
"Advances in Desiccant-Based Dehumidification", (C) 2005 American Standard, TRANE Engineers Newsletter; vol. 34-4, (2005), 1-8.
"U.S. Appl. No. 13/449,598, Final Office Action dated Feb. 4, 2016", 23 pgs.
"U.S. Appl. No. 13/449,598, Non Final Office Action dated Apr. 24, 2015", 18 pgs.
"U.S. Appl. No. 13/449,598, Non Final Office Action dated Aug. 27, 2015", 20 pgs.
"U.S. Appl. No. 13/449,598, Notice of Allowance dated Nov. 4, 2016", 9 pgs.
"U.S. Appl. No. 13/449,598, Response filed Jan. 29, 2015 to Restriction Requirement dated Jan. 5, 2015", 2 pgs.
"U.S. Appl. No. 13/449,598, Response filed Jul. 17, 2015 to Non Final Office Action dated Apr. 24, 2015", 17 pgs.
"U.S. Appl. No. 13/449,598, Response filed Nov. 16, 2015 to Non Final Office Action dated Aug. 27, 2015", 18 pgs.
"U.S. Appl. No. 13/449,598, Restriction Requirement dated Jan. 5, 2015", 10 pgs.
"U.S. Appl. No. 13/702,596, Appeal Brief filed Jun. 15, 2015", 82 pgs.
"U.S. Appl. No. 13/702,596, Final Office Action dated Jan. 30, 2015", 15 pgs.
"U.S. Appl. No. 13/702,596, Non Final Office Action dated Oct. 30, 2014", 16 pgs.
"U.S. Appl. No. 13/702,596, Notice of Allowance dated Oct. 1, 2015", 7 pgs.
"U.S. Appl. No. 13/702,596, Notice of Allowance dated Nov. 25, 2015", 2 pgs.
"U.S. Appl. No. 13/702,596, Post Allowance Amendment filed Oct. 7, 2015", 13 pgs.
"U.S. Appl. No. 13/702,596, PTO Response to Rule 312 Communication dated Oct. 19, 2015", 2 pgs.
"U.S. Appl. No. 13/702,596, Response filed Dec. 15, 2014 to Non Final Office Action dated Oct. 30, 2014", 21 pgs.
"U.S. Appl. No. 13/797,062, Appeal Brief filed Jun. 9, 2016", 33 pgs.
"U.S. Appl. No. 13/797,062, Final Office Action dated Feb. 24, 2016", 29 pgs.
"U.S. Appl. No. 13/797,062, Non Final Office Action dated May 7, 2015", 19 pgs.
"U.S. Appl. No. 13/797,062, Non Final Office Action dated Sep. 25, 2015", 24 pgs.
"U.S. Appl. No. 13/797,062, Response filed Apr. 23, 2015 to Restriction Requirement dated Mar. 13, 2015", 3 pgs.
"U.S. Appl. No. 13/797,062, Response filed Jul. 17, 2015 to Non Final Office Action dated May 7, 2015", 16 pgs.
"U.S. Appl. No. 13/797,062, Response filed Nov. 30, 2015 to Non Final Office Action dated Sep. 25, 2015", 16 pgs.
"U.S. Appl. No. 13/797,062, Restriction Requirement dated Mar. 13, 2015", 8 pgs.
"U.S. Appl. No. 13/797,152, Appeal Brief filed Jun. 9, 2016", 29 pgs.
"U.S. Appl. No. 13/797,152, Final Office Action dated Feb. 25, 2016", 14 pgs.
"U.S. Appl. No. 13/797,152, Non Final Office Action dated Aug. 25, 2015", 10 pgs.
"U.S. Appl. No. 13/797,152, Notice of Allowance dated Oct. 31, 2016", 7 pgs.
"U.S. Appl. No. 13/797,152, Response filed Nov. 20, 2015 to Non Final Office Action dated Aug. 25, 2015", 12 pgs.
"U.S. Appl. No. 13/801,280, 312 Amendment filed Jun. 18, 2015", 8 pgs.
"U.S. Appl. No. 13/801,280, Non Final Office Action dated Feb. 12, 2015", 7 pgs.
"U.S. Appl. No. 13/801,280, Notice of Allowance dated May 19, 2015", 7 pgs.
"U.S. Appl. No. 13/801,280, PTO Response to 312 Amendment dated Jul. 9, 2015", 2 pgs.
"U.S. Appl. No. 13/801,280, Response filed Jan. 7, 2015 to Restriction Requirement dated Dec. 10, 2014", 1 pg.

(56) References Cited

OTHER PUBLICATIONS

"U.S. Appl. No. 13/801,280, Response filed Mar. 31, 2015 to Non Final Office Action dated Feb. 12, 2015", 9 pgs.
"U.S. Appl. No. 13/801,280, Restriction Requirement dated Dec. 10, 2014", 9 pgs.
"U.S. Appl. No. 14/171,951, Advisory Action dated Nov. 10, 2016", 3 pgs.
"U.S. Appl. No. 14/171,951, Final Office Action dated Jun. 28, 2016", 36 pgs.
"U.S. Appl. No. 14/171,951, Non Final Office Action dated Jan. 5, 2016", 20 pgs.
"U.S. Appl. No. 14/171,951, Non Final Office Action dated May 2, 2016", 35 pgs.
"U.S. Appl. No. 14/171,951, Notice of Allowance dated Feb. 3, 2017", 5 pgs.
"U.S. Appl. No. 14/171,951, Response filed Mar. 28, 2016 to Non Final Office Action dated Jan. 5, 2016", 18 pgs.
"U.S. Appl. No. 14/171,951, Response filed Jun. 9, 2016 to Non Final Office Action dated May 2, 2016", 24 pgs.
"U.S. Appl. No. 14/171,951, Response filed Oct. 28, 2016 to Final Office Action dated Jun. 28, 2016", 15 pgs.
"U.S. Appl. No. 14/171,951, Response filed Dec. 3, 2015 to Restriction Requirement dated Nov. 16, 2015", 6 pgs.
"U.S. Appl. No. 14/171,951, Response filed Dec. 15, 2016 to Advisory Action dated Nov. 10, 2016", 16 pgs.
"U.S. Appl. No. 14/171,951, Restriction Requirement dated Nov. 16, 2015", 13 pgs.
"U.S. Appl. No. 14/186,420, Notice of Allowance dated Jan. 27, 2017", 7 pgs.
"U.S. Appl. No. 14/187,413, Advisory Action dated Nov. 10, 2016", 4 pgs.
"U.S. Appl. No. 14/187,413, Final Office Action dated Jul. 28, 2016", 20 pgs.
"U.S. Appl. No. 14/187,413, Non Final Office Action dated Feb. 8, 2017", 15 pgs.
"U.S. Appl. No. 14/187,413, Non Final Office Action dated Mar. 17, 2016", 15 pgs.
"U.S. Appl. No. 14/187,413, Response filed Feb. 25, 2015 to Restriction Requirement dated Feb. 16, 2016", 3 pgs.
"U.S. Appl. No. 14/187,413, Response filed May 26, 2016 to Non Final Office Action dated Mar. 17, 2016", 15 pgs.
"U.S. Appl. No. 14/187,413, Response filed Oct. 28, 2016 to Final Office Action dated Jul. 28, 2016", 17 pgs.
"U.S. Appl. No. 14/187,413, Response filed Dec. 21, 2016 to Advisory Action dated Nov. 10, 2016", 15 pgs.
"U.S. Appl. No. 14/187,413, Restriction Requirement dated Feb. 16, 2016", 6 pgs.
"U.S. Appl. No. 14/804,953, Non Final Office Action dated Sep. 15, 2016", 8 pgs.
"U.S. Appl. No. 14/804,953, Response filed Dec. 15, 2016 to Non Final Office Action dated Sep. 15, 2016", 7 pgs.
"Ashrae Technical Committee", Meeting Programs, (Jan. 29, 1997), 13 pgs.
"Australian Application Serial No. 2011268661, First Examiner Report dated Sep. 24, 2014", 5 pgs.
"Australian Application Serial No. 2011268661, Response filed Jul. 20, 2015 to First Examiner Report dated Sep. 24, 2014", 8 pgs.
"Australian Application Serial No. 2011268661, Response filed Sep. 23, 2015 to Second Examiner Report dated Aug. 18, 2015", 5 pgs.
"Australian Application Serial No. 2011268661, Second Examiner Report dated Aug. 18, 2015", 6 pgs.
"Australian Application Serial No. 2012208921, First Examiner Report dated Jun. 2, 2016", 7 pgs.
"Australian Application Serial No. 2012304223, First Examiner Report dated Aug. 5, 2016", 4 pgs.
"Canadian Application Serial No. 2,801,352, Office Action dated Aug. 15, 2016", 3 pgs.
"Canadian Application Serial No. 2,843,763, Office Action dated Dec. 4, 2014", 3 pgs.
"Canadian Application Serial No. 2,843,763, Response filed May 12, 2015 to Office Action dated Dec. 4, 2014", 31 pgs.
"Canadian Application Serial No. 2,901,483, Office Action dated Nov. 23, 2016", 4 pgs.
"Chapter 8—Heating, Ventilating, and Air Conditioning (HVAC) Demonstration", HVAC Demonstration, (published prior to Feb 21, 2014), 16 pgs.
"Chinese Application Serial No. 201280006006.9, Office Action dated Feb. 2, 2016", (w/ English Summary), 19 pgs.
"Chinese Application Serial No. 201280006006.9, Response filed Apr. 8, 2016 to Office Action dated Feb. 2, 2016", (w/ English Translation of Claims), 64 pgs.
"Chinese Application Serial No. 201280006006.9, Voluntary Amendment filed Apr. 14, 2014", 61 pgs.
"Chinese Application Serial No. 201180031103.9, Office Action dated Feb. 11, 2015", (w/ English Translation), 16 pgs.
"Chinese Application Serial No. 201180031103.9, Office Action dated Jun. 13, 2014", (With English Translation), 19 pgs.
"Chinese Application Serial No. 201180031103.9, Office Action dated Sep. 9, 2015", (w/ English Translation), 3 pgs.
"Chinese Application Serial No. 201180031103.9, Office Action dated Nov. 6, 2015", (w/ English Translation), 5 pgs.
"Chinese Application Serial No. 201180031103.9, Response filed Apr. 27, 2015 to Office Action dated Feb. 11, 2015", (w/ English Translation), 15 pgs.
"Chinese Application Serial No. 201180031103.9, Response filed Sep. 26, 2014 to Office Action dated Jun. 13, 2014", (w/ English Translation), 12 pgs.
"Chinese Application Serial No. 201180031103.9, Response filed Sep. 29, 2015 to Office Action dated Sep. 9, 2015", (w/ English Translation), 78 pgs.
"Chinese Application Serial No. 201280006006.9, Office Action dated May 13, 2015", 3 pgs.
"Chinese Application Serial No. 201280006006.9, Office Action dated Aug. 15, 2016", (English Translation), 18 pgs.
"Chinese Application Serial No. 201280006006.9, Response filed Sep. 28, 2015 to Office Action dated May 13, 2015", (w/ English Translation of Claims), 71 pgs.
"Chinese Application Serial No. 201280006006.9, Response filed Dec. 30, 2016 to Office Action dated Aug. 15, 2016", (with English Translation of Claims), 69 pgs.
"Chinese Application Serial No. 201280042778.8, Office Action dated Feb. 3, 2016", (With English Translation), 9 pgs.
"Chinese Application Serial No. 201280042778.8, Office Action dated Sep. 7, 2016", 3 pgs.
"Chinese Application Serial No. 201280042778.8, Response filed May 25, 2016 to Office Action dated Feb. 3, 2016", Without English Translation of Claims, 46 pgs.
"Chinese Application Serial No. 201280042778.8, Response filed Nov. 16, 2016 to Office Action dated Sep. 7, 2016", Without English Translation of Claims, 43 pgs.
"Chinese Application Serial No. 201380042926.0, Office Action dated Feb. 26, 2016", (With English Translation), 15 pgs.
"Chinese Application Serial No. 201380042926.0, Office Action dated Sep. 28, 2016", (w/ English Translation), 12 pgs.
"Chinese Application Serial No. 201380042926.0, Response filed Jul. 7, 2016 to Office Action dated Feb. 26, 2016", Without English Translation of Claims, 36 pgs.
"Chinese Application Serial No. 201380044484.3, Office Action dated Jan. 13, 2017", (w/ English Translation), 16 pgs.
"Chinese Application Serial No. 201380044484.3, Office Action dated Mar. 28, 2016", (w/ English Translation), 16 pgs.
"Chinese Application Serial No. 201380044484.3, Response filed Oct. 12, 2016 to Office Action dated Mar. 28, 2016", (w/ English Translation of Claims), 54 pgs.
"Chinese Application Serial No. 201480015355.6, Office Action dated Nov. 28, 2016", (w/ English Translation), 8 pgs.
"Chinese Application Serial No. 201480015422.4, Office Action dated Nov. 1, 2016", (w/ English Translation), 13 pgs.
"Chinese Application Serial No. 201480015766.5, Office Action dated Oct. 19, 2016", (w/ English Translation), 9 pgs.
"Dehumidification Solutions", Des Champs Laboratories, Inc, (2001), 18 pgs.

(56) References Cited

OTHER PUBLICATIONS

"Desi-WringerTM Precision Desiccant Dehumidification Systems", Des Champs Technologies, (2007), 12 pgs.
"Energy Recovery—Fresh in Air Quality", SEMCO Inc., (published before Apr. 12, 2012), 131 pgs.
"European Application Serial No. 11797695.1, Extended European Search Report dated Jun. 25, 2016", 11 pgs.
"European Application Serial No. 11797695.1, Partial Supplementary European Search Report dated Oct. 7, 2015", 6 pgs.
"European Application Serial No. 11797695.1, Response filed Aug. 22, 2016 to Extended European Search Report dated Jun. 25, 2016", 9 pgs.
"European Application Serial No. 12736074.1, Extended European Search Report dated Jul. 13, 2015", 8 pgs.
"European Application Serial No. 12736074.1, Response filed Oct. 2, 2015 to Extended European Search Report dated Jul. 13, 2015", 10 pgs.
"European Application Serial No. 12827918.9, Extended European Search Report dated Jul. 6, 2015", 6 pgs.
"European Application Serial No. 12827918.9, Response filed Sep. 28, 2015 to Extended European Search Report dated Jul. 6, 2015", 8 pgs.
"European Application Serial No. 13830357.3, Extended European Search Report dated Jun. 8, 2016", 5 pgs.
"European Application Serial No. 13830357.3, Response filed Dec. 23, 2016 to Extended European Search Report dated Jun. 8, 2016", 11 pgs.
"European Application Serial No. 13830940.6, Extended European Search Report dated Jul. 4, 2016", 5 pgs.
"European Application Serial No. 14764192.2, Extended European Search Report dated Oct. 27, 2016", 7 pgs.
"European Application Serial No. 14764192.2, Response filed Apr. 13, 2016 to Communication Pursuant Rules 161(2) and 162 EPC dated Nov. 19, 2015", 9 pgs.
"European Application Serial No. 14764305.0, Response filed Apr. 13, 2016 to Communication Pursuant to Article 94(3) EPC dated Oct. 8, 2015", 10 pgs.
"European Application Serial No. 14764318.3, Response filed Jan. 28, 2016 to Communication pursuant to Rules 161(1) and 162 EPC dated Nov. 19, 2015", 17 pgs.
"European Application Serial No. 14764713.5, Extended European Search Report dated Dec. 9, 2016", 6 pgs.
"European Application Serial No. 14764713.5, Response filed Jan. 28, 2016 to Communication pursuant to Rules 161(1) and 162 EPC dated Dec. 2, 2015", 9 pgs.
"European Application Serial No. 14765396.8, Extended European Search Report dated Oct. 28, 2016", 6 pgs.
"European Application Serial No. 14765396.8, Office Action dated Nov. 20, 2015", 2 pgs.
"European Application Serial No. 14765396.8, Response filed Jan. 29, 2016 to Office Action dated Nov. 20, 2015", 12 pgs.
"International Application Serial No. PCT/CA2012/000055, Invitation to Pay Add! Fees and Partial Search Report dated Mar. 23, 2012", 2 pgs.
"International Application Serial No. PCT/CA2012/000749, International Search Report dated Oct. 26, 2012", 3 pgs.
"International Application Serial No. PCT/CA2012/000749, Written Opinion dated Oct. 26, 2012", 5 pgs.
"International Application Serial No. PCT/CA2013/000608, International Preliminary Report on Patentability dated Mar. 5, 2015", 7 pgs.
"International Application Serial No. PCT/CA2013/000608, International Search Report dated Sep. 23, 2013", 3 pgs.
"International Application Serial No. PCT/CA2013/000608, Written Opinion dated Sep. 23, 2013", 5 pgs.
"International Application Serial No. PCT/CA2013/000609, International Preliminary Report on Patentability dated Mar. 5, 2015", 7 pgs.
"International Application Serial No. PCT/CA2013/000609, International Search Report dated Sep. 17, 2013", 3 pgs.
"International Application Serial No. PCT/CA2013/000609, Written Opinion dated Sep. 17, 2013", 5 pgs.
"International Application Serial No. PCT/CA2014/000048, International Preliminary Report on Patentability dated Sep. 24, 2015", 8 pgs.
"International Application Serial No. PCT/CA2014/000048, International Search Report dated Apr. 29, 2014", 3 pgs.
"International Application Serial No. PCT/CA2014/000048, Written Opinion dated Apr. 29, 2014", 6 pgs.
"International Application Serial No. PCT/CA2014/000083, International Preliminary Report on Patentability dated Sep. 24, 2015", 9 pgs.
"International Application Serial No. PCT/CA2014/000083, International Search Report dated May 14, 2014", 3 pgs.
"International Application Serial No. PCT/CA2014/000083, Written Opinion dated May 14, 2014", 7 pgs.
"International Application Serial No. PCT/CA2014/000148, International Preliminary Report on Patentability dated Sep. 24, 2015", 5 pgs.
"International Application Serial No. PCT/CA2014/000148, International Search Report dated May 9, 2014", 4 pgs.
"International Application Serial No. PCT/CA2014/000148, Written Opinion dated May 9, 2014", 3 pgs.
"International Application Serial No. PCT/CA2014/000169, International Preliminary Report on Patentability dated Sep. 24, 2015", 8 pgs.
"International Application Serial No. PCT/CA2014/000169, International Search Report dated May 27, 2014", 3 pgs.
"International Application Serial No. PCT/CA2014/000169, Written Opinion dated May 27, 2014", 6 pgs.
"International Application Serial No. PCT/CA2014/000171, International Preliminary Report on Patentability dated Sep. 24, 2015", 7 pgs.
"International Application Serial No. PCT/CA2014/000171, International Search Report dated May 27, 2014", 3 pgs.
"International Application Serial No. PCT/CA2014/000171, Written Opinion dated May 27, 2014", 5 pgs.
"International Application Serial No. PCT/CA2015/050787, International Search Report dated Nov. 4, 2015", 3 pgs.
"International Application Serial No. PCT/CA2015/050787, Written Opinion dated Nov. 4, 2015", 3 pgs.
"International Application Serial No. PCT/CA2016/050252, International Search Report dated May 26, 2016", 3 pgs.
"International Application Serial No. PCT/CA2016/050252, Written Opinion dated May 26, 2016", 4 pgs.
"International Application Serial No. PCT/CA2016/050507, International Search Report dated Jul. 21, 2016", 3 pgs.
"International Application Serial No. PCT/CA2016/050507, Written Opinion dated Jul. 21, 2016", 3 pgs.
"International Application Serial No. PCT/162011/002145, International Preliminary Report on Patentability dated Jan. 10, 2013", 13 pgs.
"International Application Serial No. PCT/162011/002145, International Search Report dated Feb. 15, 2012", 7 pgs.
"International Application Serial No. PCT/162011/002145, Written Opinion dated Feb. 15, 2012", 11 pgs.
"International Application Serial No. PCT/162016/053799, International Search Report dated Aug. 26, 2016", 3 pgs.
"International Application Serial No. PCT/162016/053799, Written Opinion dated Aug. 26, 2016", 6 pgs.
"Two-Wheel Desiccant Dehumidification System - Technology for Dehumidification and Improving Indoor Air Quality", Federal Technology Alert, (Apr. 1997), 24 pgs.
Abdel-Salam, Mohamed R. H., et al., "Experimental Study of Effects of Phase-Change Energy and Operating Parameters on Performances of Two-Fluid and Three-Fluid Liquid-to-Air Membrane Energy Exchangers", ASHREA Transactions, vol. 122, Part 1, (Jan. 2016), 134-145.
Abdel-Salam, Mohamed R. H., et al., "Performance testing of 2-fluid and 3-fluid liquid-to-air membrane energy exchangers for HVAC applications in cold-dry climates", International Journal of Heat and Mass Transfer, 106, (2017), 558-569.

(56) References Cited

OTHER PUBLICATIONS

Abdel-Salam, Mohamed R. H., et al., "Performance testing of a novel 3-fluid liquid-to-air membrane energy exchanger (3-fluid LAMEE) under desiccant solution regeneration operating conditions", International Journal of Heat and Mass Transfer, 95, (2015), 773-786.

Acker, William, "Industrial Dehumidification: Water Vapor Load Calculations and System Descriptions", HPAC Heatina/Pioina/Air Conditionina, (Mar. 1999), 49-59.

Bellia, L., et al., "Air Conditioning Systems With Desiccant Wheel for Italian Climates", International Journal on Architectural Science vol. 1 No. 4, (2000), 193-213.

Bergero, Stefano, et al., "On the performances of a hybrid air-conditioning system in different climatic conditions", Energy 36(8), (2011), 5261-5273.

Chant, Eileen E., et al., "A Steady-State Simulation of an Advanced Desiccant-Enhanced Cooling and Dehumidification System", ASHRAE Transactions: Research, (Jul. 1992), 339-347.

Coad, William J., "Conditioning Ventilation Air for Improved Performance and Air Quality", HPAC Heating/Piping/Air Conditioning, (Sep. 1999), 6 pgs.

Diblasio, Robert, "Desicants in Hospitals—Conditioning a Research Facility", DiBLASIO Engineered Systems, (Sep. 1995), 4 pgs.

Downing, et al., "Operation and Maintenance for Quality Indoor Air", Proceedings of the 7th Symposium on Improving Building Systems in Hot and Humid Climates, Ft. Worth, TX, (Oct. 9, 1990), 5 pgs.

Downing, Chris, "Humidity Control—No Place Like Home", Engineered Systems, (1996), 4 pgs.

Erb, Blake, et al., "Experimental Measurements of a Run-Around Membrane Energy Exchanger (RAMEE) with Comparison to a Numerical Model", Ashrae Transactions, (2009).

Fischer, J., et al., "Active Desiccant Dehumidification Module Integration With Rooftop Packaged HPAC Units—Final Report Phase 3B", Oak Ridge National Laboratory, (Mar. 2002), 36 pgs.

Fischer, John C., "Optimizing IAQ, Humidity Control, and Energy Efficiency in School Environments Through the Application of Desiccant-Based Total Energy Recovery Systems", IAQ '96. Atlanta: Paths to Better Building Environments/Environmental Effects on Heath and Productivity, (1996), 179-194.

Harriman, III, et al., "Dehumidification and Cooling Loads From Ventilation Air", ASHRAE Journal, (Nov. 1997), 7 pgs.

Harriman, III, et al., "Evaluating Active Desiccant Systems for Ventilating Commercial Buildings", ASHRAE Journal, (Oct. 1999), 7 pgs.

Harriman, III, et al., "New Weather Data for Energy Calculations", ASHRAE Journal, (Mar. 1999), 7 pgs.

Jeong, et al., "Energy Conservation Benefits of a Dedicated Outdoor Air System with Parallel Sensible Cooling by Ceiling Radiant Panels", ASHRAE Transactions; vol. 109. Part 2, (2003), 10 pgs.

Karniadakis, George E., et al., "Mimimum-dissipation transport enhancement by flow destabilization: Reynolds' analogy revisited", J. Fluid Mech vol. 192, (1988), 365-391.

Kosar, Douglas R., et al., "Dehumidification Issues of Standard 62-1989", ASHRAE Journal, (Mar. 1998), 71-75.

Larson, Michael David, et al., "The Performance of Membranes in a Newly Proposed Run-Around Heat and Mositure Exchanger", Thesis Submitted to the College of Graduate Studies and Research in Partial Fulfillment of the Requirements for the Degree of Master of Science in the Department of Mechanical Engineering UniversitY of Saskatchewan Saskatoon Canada, http/ /lib ran. usask.ca/theses/available/etd-12192006-094159/umestricted/ Larson Thesis.pdf, (Dec. 2006), 177 pgs.

Mahmud, Khizir, "Design and Performance Testing of Counter-Cross-Flow Run-Around Membrane Energy Exchanger System", Master Thesis Submitted to the College of Graduate Studies and Research in Partial Fulfillment of the Requirements for the Degree of Master of Science in the Department of Mechanical Engineering University of Saskatchewan Saskatoon Canada, http I /libran*. usask. ca/theses/ available/ etd-09092009-223 83 3/umestricted/ Khizir_Mahmud 2009-Sep-28a. pdf, (Sep. 2009), 168 pgs.

Mahmud, Khizir, et al., "Performance testing of a counter-cross-flow run-around membrane energy exchanger (RAMEE) system for HVAC applications", Energy and Buildings, 42, (2010), 1140-1146.

Mahmud, Khizir, et al., "Performance testing of a counter-cross-flow run-around membrane energy exchanger (RAMEE) system for HVAC applications", Energy and Buildings 42, (2010), 1139-1147.

McGahey, Kevin, et al., "Desiccants: Benefits for the Second Century of Air Conditioning", Proceedings of the Tenth Symposium on Improving Building Systems in Hot and Humid Climates, Ft. Worth, Texas, (May 14, 1996), 9 pgs.

McGahey, Kevin, "New Commercial Applications for Desiccant-Based Cooling", ASHRAE Journal, (Jul. 1998), 41-45.

Mumma, Stanley A., et al., "Achieving Dry Outside Air in an Energy-Efficient Manner", ASH RAE Transactions 2001; vol. 107; Part 1, (2001), 8 pgs.

Mumma, Stanley A., "Dedicated Outdoor Air-Dual Wheel System Control Requirements", ASHRAE Transactions 2001; vol. 107; Part 1, (2001), 9 pgs.

Mumma, Stanley A., et al., "Extension of the Multiple Spaces Concept of ASH RAE Standard 62 to Include Infiltration, Exhaust/ Exfiltration, Interzonal Transfer, and Additional Short-Circuit Paths", ASHRAE Transactions: Symposia, (1998), 1232-1241.

Mumma, Stanley A, "Overview of Integrating Dedicated Outdoor Air Systems With Parallel Terminal Systems", ASH RAE Transactions vol. 107; Part 1, (2001), 7 pgs.

Nimmo, B. G., et al., "DEAC: Desiccant Enhancement of Cooling-Based Dehumidification", ASHRAE Transactions: Symposia, (1993), 842-848.

Qin, C. K., et al., "Engine-driven Desiccant-assisted Hybrid Air-conditioning System", 23rd World Gas Conference, Amsterdam, (2006), 15 pgs.

Ryan, K., et al., "Three-dimensional transition in the wake of bluff elongated cylinders", J. Fluid, Mech vol. 538, (2005), 1-29.

Scofield, et al., "HVAC Design for Classrooms: Divide and Conquer", Heating/Piping/Air Conditioning, (May 1993), 53-59.

Sevigny, et al., "Air Handling Unit Direct Digital Control System Retrofit to Provide Acceptable Indoor Air Quality and Global Energy Optimization", Energy Engineering; vol. 94; No. 5, (1997), 24-43.

Shank, et al., "Selecting the Supply Air Conditions for a Dedicated Outdoor Air System Working in Parallel with Distributed Sensible Cooling Terminal Equipment", ASHRAE Transactions vol. 107; Part 1, (2001), 10 pgs.

Smith, Christopher S., et al., "Outdoor Air, Heat Wheels and JC Penny: A New Approach to Retail Ventilation", Proceedings of the Eleventh Symposium on Improving Building Systems in Hot and Humid Climates, Ft. Worth, Texas, (Jun. 2,1998), 1 pg.

Smith, James C., "Schools Resolve IAQ/Humidity Problems with Desiccant Preconditioning", Heating/Piping/Air Conditioning, (Apr. 1996), 6 pgs.

Swails, James F., et al., "A Cure for Growing Pains", Consulting Specifying Engineer, [Online] retrieved from the internet:www. csermag.com, (Jun. 1997), 4 pgs.

Turpin, Joanna, "Dehumidification: The Problem No One Wants to Talk About (Apr. 2000)", [online] [retrieved on May 6, 2011]. Retrieved from the Internet: http//www.esmagazine.com/ copyrightvde12c1c879ba801 0VCM1 00000f932a8c0_?>, (posted on Apr. 5, 2000), 6 pgs.

Vali, et al., "Numerical model and effectiveness correlations for a run-around heat recovery system with combined counter and cross flow exchangers", International Journal of Heat and Mass Transfer 52, (2009), 5827-5840 pgs.

Vali, Alireza, "Modeling a Run-Around Heat and Moisture Exchanger Using Two Counter/Cross Flow Exchangers", Master Thesis Submitted to the College of Graduate Studies and Research in Partial Fulfillment of the Requirements for the Degree of Master of Science in the Department of Mechanical Engineering University of Saskatchewan Saskatoon Canada, http:/ /library. usask.ca/theses/m ailable/etd-060 3 2009-15-J.6-J.-1./unrestricted/ Vali.Alireza Thesis. pdf, (2009), 193 pgs.

(56) References Cited

OTHER PUBLICATIONS

Woods, J, et al., "Desiccant Enhanced Evaporative Air Conditioning: Parametric Analysis and Design", Presented at the Second International Conference on Building Energy and Environment (COBEE2012), Conference Paper, (Oct., 2012), 10 pgs.
Yborra, Stephen C., "Field Evaluation of Desiccant-Integrated HVAC Systems: A Review of Case Studies in Multiple Commercial/Institutional Building Types", Proceedings of the Eleventh Symposium on Improving Building Systems in Hot and Humid Climates, Ft. Worth, Texas, (Jun. 2, 1998), 361-370.
"U.S. Appl. No. 12/870,545, Corrected Notice of Allowance dated Mar. 14, 2017", 7 pgs.
"U.S. Appl. No. 12/870,545, Corrected Notice of Allowance dated Mar. 23, 2017", 7 pgs.
"U.S. Appl. No. 12/870,545, Notice of Allowance dated Feb. 27, 2017", 9 pgs.
"U.S. Appl. No. 12/870,545, Notice of Allowance dated May 18, 2017", 9 pgs.
"U.S. Appl. No. 13/275,633, Advisory Action dated Mar. 30, 2017", 3 pgs.
"U.S. Appl. No. 13/275,633, Appeal Brief filed Feb. 27, 2017", 29 pgs.
"U.S. Appl. No. 14/186,420, Notice of Allowance dated May 31, 2017", 7 pgs.
"Chinese Application Serial No. 201510655570.9, Office Action dated Apr. 1, 2017", (w/ English Translation), 14 pgs.
"European Application Serial No. 12736074.1, Communication Pursuant to Article 94(3) EPC dated Feb. 9, 2017", 4 pgs.
"Chinese Application Serial No. 201280006006.9, Decision of Rejection dated May 4, 2017", W/ summary in English, 7 pgs.
"Chinese Application Serial No. 201280006006.9, Response filed Aug. 21, 2017 to Decision of Rejection dated May 4, 2017", w/ claims in English, 12 pgs.
"European Application Serial No. 12736074.1, Response filed Aug. 17, 2017 to Communication Pursuant to Article 94(3) EPC dated Feb. 9, 2017", 5 pgs.
"Canadian Application Serial No. 2,823,421, Office Action dated Dec. 15, 2017", 4 pgs.

\* cited by examiner

|  | 302 | 328 | 330 | 332 |
|---|---|---|---|---|
| Outside Temp (P1) | | 35/33 | 17/15 | 5/3 |
| DX coil EAT (P2) | | 60.3/46.9 | 55.5/43 | 52.3/40.9 |
| RA Temp (P3) | | 70/25% | 70/25% | 70/25% |
| Desuperheater EAT (P4) | | 44.7/38.7 | 31.5/27.3 | 22.7/20.1 |
| Desuperheater LAT (P5) | | 57.87/45.38 | 46.15/36.1 | 40/30.5 |
| Condenser LAT (P6) | | 28.29/27.49 | 21.2/20.2 | 17.7/16.8 |
| Capacity (MBH) | | 237.9 | 184 | 181.6 |
| Supply Air D8 (°F) | | 87.7 | 76.7 | 73.2 |
| Power (W) | | 21599.88 | 19152 | 18602 |
| COP (W/W) | | 3.2 | 2.8 | 2.9 |
| Sat. suction temp (°F) | | 21.9 | 14 | 12.5 |
| Condensing temp (°F) | | 90.2 | 78.8 | 75.2 |

FIG. 3

| | Without Desuperheater | With Desuperheater |
|---|---|---|
| Supply CFM | 8000 | 8000 |
| Condenser CFM | 14000 | 14000 |
| Outside Air Temp (P1) | 95/78 | 95/78 |
| DX Coil EAT (P2) | 80.8/68.5 | 80.8/68.5 |
| RA Temp (P3) | 75/63 | 75/63 |
| Desuperheater EAT (P4) | | 91.68 |
| Condenser EAT (P5) | 91.68 | 97.65 |
| DX Cooling Capacity (MBH) | 388 | 399.7 |
| Power (W) | 32568.44 | 31400 |
| EER | 11.9 | 12.7 |
| Supply Air Temp (*F) | 52.6/52.6 | 51.94/51.94 |
| Sat. Suction Temp (*F) | 47.15 | 46.69 |
| Condensing Temp (*F) | 127.5 | 123.7 |

FIG. 7

HEAT PUMP SYSTEM HAVING A PRE-PROCESSING MODULE

CROSS-REFERENCE TO RELATED APPLICATIONS

The present application is a continuation-in-part of U.S. patent application Ser. No. 13/009,222 entitled "Heat Pump System Having a Pre-Processing Module" filed Jan. 19, 2011, the complete subject matter of which is hereby expressly incorporated by reference in its entirety.

BACKGROUND OF THE INVENTION

The subject matter described herein relates to a heat pump system and, more particularly, to a heat pump system for low temperature operation.

Existing air-to-air heat pumps generally include a supply air channel and a regeneration air channel. An energy exchange module extends between the supply air channel and the regeneration air channel. The energy exchange module transfers sensible and/or latent heat between the outside air in the supply air channel and the regeneration air in the regeneration air channel. The supply air channel and the regeneration air channel also include heat exchangers. The supply air channel includes a supply air heat exchanger and the regeneration air channel includes a regeneration air heat exchanger. The supply air heat exchanger and the regeneration air heat exchanger are in fluid communication through a refrigeration system to further transfer heat between the outside air and the regeneration air. In a winter mode, heat and/or moisture in the regeneration air is transferred to the outside air to generate heated and/or humidified supply air that is discharged from the supply air channel. During a summer mode, heat and moisture in the outside air is transferred to the regeneration air to generate cooled and dehumidified supply air that is discharged from the supply air channel.

However, conventional heat pump systems are not without their disadvantages. During winter modes, when the outside temperature has dropped below approximately 35° F./33° F., frost may form on the coils of the regeneration air heat exchanger. Accordingly, the heat pump system must be shut down so that the coils can be defrosted. During the time period that the heat pump system is shut down, the building incorporating the heat pump system must go without a heat source or requires an auxiliary heat source or recirculated air. Additionally, during summer modes, the regeneration air heat exchanger may be required to supply large amounts of heat to the regeneration air. As a result, an efficiency of the regeneration air heat exchanger may decrease substantially.

A need remains for a means to preheat the regeneration air during winter modes to prevent frost formation on the regeneration air heat exchanger at temperatures below approximately 35° F./33° F. Another needs remains to increase the efficiency of the regeneration air heat exchanger by lowering the condensation temperature during the summer mode using a pre-processing module in the regeneration air.

SUMMARY OF THE INVENTION

In one embodiment, a heat pump system for conditioning air in a space is provided. The system includes a supply air channel to receive outside air and discharge supply air into a space. A regeneration air channel is provided to receive regeneration air from the space and discharge exhaust air. The regeneration air channel and the supply air channel are separated by a partition. An energy recovery module is provided having a supply air side positioned in the supply air channel and a regeneration air side positioned in the regeneration air channel. The regeneration air side of the energy recovery module removes heat and moisture from the regeneration air in the regeneration air channel in a winter mode. A regeneration air heat exchanger is positioned in the regeneration air channel downstream from the regeneration air side of the energy recovery module. The regeneration air heat exchanger removes heat from the regeneration air in the winter mode. The regeneration air heat exchanger discharges the exhaust air. A pre-processing module is positioned in the regeneration air channel between the regeneration air side of the energy recovery module and the regeneration air heat exchanger. The pre-processing module heats the regeneration air from the energy recovery module in the winter mode to prevent frost from forming on the regeneration air heat exchanger.

In another embodiment, a heat pump system for conditioning air in a space is provided. The system comprising a supply air channel to receive outside air and discharge supply air into a space. A regeneration air channel is provided to receive regeneration air from the space and discharge exhaust air. The regeneration air channel and the supply air channel are separated by a partition. An energy recovery module is provided having a supply air side positioned in the supply air channel and a regeneration air side positioned in the regeneration air channel. The regeneration air side of the energy recovery module heats and humidifies the regeneration air in the regeneration air channel in a summer mode. A regeneration air heat exchanger is positioned in the regeneration air channel downstream from the regeneration air side of the energy recovery module. The regeneration air heat exchanger heats the regeneration air in the summer mode. The regeneration air heat exchanger discharges the exhaust air. A pre-processing module is positioned in the regeneration air channel between the regeneration air side of the energy recovery module and the regeneration air heat exchanger. The pre-processing module heats the regeneration air from the energy recovery module in the summer mode to lower a condensation temperature and increase an efficiency of the regeneration air heat exchanger.

In another embodiment, a heat pump system for conditioning air in a space is provided. The system includes a supply air channel to receive outside air and discharge supply air into a space. A regeneration air channel is provided to receive regeneration air from the space and discharge exhaust air. The regeneration air channel and the supply air channel are separated by a partition. A supply air heat exchanger is positioned in the supply air channel to condition the outside air in the supply air channel. A regeneration air heat exchanger is positioned in the regeneration air channel to condition the regeneration air in the regeneration air channel. Heat is transferred between the regeneration air heat exchanger and the supply air heat exchanger. A pre-processing module is positioned in the regeneration air channel upstream from the regeneration air heat exchanger. The pre-processing module heats the regeneration air in the regeneration air channel.

In another embodiment, a method for conditioning air in a space is provided. The method includes positioning a supply air channel adjacent to a regeneration air channel. The regeneration air channel and the supply air channel are separated by a partition. The supply air channel receives outside air and discharges supply air into a space. The regeneration air channel receives regeneration air from the space and discharges exhaust air. A supply air heat exchanger is positioned in the supply air channel to condition the outside air in the supply air channel. A regeneration air heat exchanger is positioned in the regeneration air channel to condition the regeneration air in the regeneration air channel. Heat is transferred between the regeneration air heat exchanger and the supply air heat exchanger. A pre-processing module is positioned in the regeneration air channel upstream from the regeneration air heat exchanger. The regeneration air is heated in the regeneration air channel with the pre-processing module.

In another embodiment, a method conditioning air in a space is provided. The method includes positioning a supply air channel adjacent to a regeneration air channel. The regeneration air channel and the supply air channel are separated by a partition. The supply air channel receives outside air and discharges supply air into a space. The regeneration air channel receives regeneration air from the space and discharges exhaust air. A supply air side of an energy recovery module is positioned in the supply air channel. A regeneration air side of the energy recovery module is positioned in the regeneration air channel. The energy recovery module transfers heat and moisture between the regeneration air and the outside air. A regeneration air heat exchanger is positioned in the regeneration air channel downstream from the regeneration air side of the energy recovery module. The regeneration air is conditioned with the regeneration air heat exchanger. A pre-processing module is positioned in the regeneration air channel between the regeneration air side of the energy recovery module and the regeneration air heat exchanger. The regeneration air in the regeneration air channel is heated with the pre-processing module.

Certain embodiments provide a heat pump system for conditioning air in a space. The system may include a supply air channel configured to receive air and discharge supply air into a space. The supply air channel has a supply air inlet and supply air outlet. The system may also include a regeneration air channel configured to receive regeneration air from the space and discharge exhaust air. The regeneration air channel and the supply air channel are separated by a partition. The regeneration air channel has a regeneration air inlet and a regeneration air outlet.

A regeneration air heat exchanger is positioned in the regeneration air channel. The regeneration air heat exchanger is configured to remove heat from the regeneration air during a heating cycle.

At least one recirculation damper is positioned within the partition. The at least one recirculation damper is configured to be opened during a defrost cycle to provide a recirculation loop of regeneration air that recirculates through a defrost airflow path defined by at least a portion of a pre-processing segment of the supply air channel and at least a portion of a downstream segment of the regeneration air channel. The recirculation loop of exhaust air removes frost from the regeneration air heat exchanger during the defrost cycle.

The at least one recirculation damper may include first and second recirculation dampers. For example, the first and second recirculation dampers may be spaced apart on the partition.

The heat pump system may also include an inlet damper disposed within the supply air channel proximate the supply inlet. The inlet damper is closed during the defrost cycle and open during the heating cycle. The heat pump system may also include an outlet damper disposed within the regeneration air channel proximate the regeneration outlet. The outlet damper is closed during the defrost cycle and open during the heating cycle.

The heat pump system may also include a preheater disposed within the supply air channel. The recirculation loop of regeneration air passes through the preheater during the defrost cycle.

The heat pump system may also include a humidifier disposed within the supply air channel. The recirculation loop of regeneration air passes through the preheater during the defrost cycle.

The heat pump system may also include an energy recovery module having a supply air side positioned in the supply air channel and a regeneration air side positioned in the regeneration air channel. The regeneration air side of the energy recovery module is configured to remove heat and moisture from the regeneration air in the regeneration air channel during the heating cycle.

The heat pump system may also include a pre-processing module positioned in the regeneration air channel between the regeneration air side of the energy recovery module and the regeneration air heat exchanger. The pre-processing module is configured to heat the regeneration air from the energy recovery module during the heating cycle to prevent frost from forming on the regeneration air heat exchanger.

The heat pump system may also include a compressor configured to condition a refrigerant flowing through the regeneration air heat exchanger. The heat pump system may also include a head pressure control valve operatively connected to the compressor. The head pressure control valve is configured to be engaged to ensure proper functioning of the compressor.

The heat pump system may also include a refrigerant path connected to the regeneration air heat exchanger. A valve is disposed within the refrigerant path. The valve is closed during the heating cycle and open during the defrost cycle. The valve may include a solenoid valve, or various other types of closing device. The heat pump system may also include a hot gas reheat coil connected to the regeneration air heat exchanger through a refrigerant path.

The heat pump system may also include at least one supply air fan within the supply air channel, and at least one regeneration air fan within the regeneration air channel.

The heat pump system may also include a control system configured to selectively operate the heat pump system between the heating cycle and the defrost cycle. The heating cycle may occur over a first period of time, and the defrost cycle may occur over a second period of time. The second period of time may be shorter than the first period of time. The second period of time may be between 10-20% the first period of time.

Certain embodiments provide a method of preventing frost from forming on a regeneration air heat exchanger within a regeneration air channel of a heat pump system. The method may include deactivating supply and exhaust fans positioned within supply air and regeneration air channels, respectively, closing inlet and outlet dampers disposed within the supply air and regeneration air channels, respectively, opening recirculation dampers disposed within a partition that separates the supply air and regeneration air channels, and recirculating a loop of regeneration air between the supply air and regeneration air channels, wherein the loop of regeneration air removes frost from the regeneration air heat exchanger.

The method may also include opening a valve within a refrigerant line that connects a compressor and the regeneration air heat exchanger.

The method may also include selectively operating a hot gas reheat coil that is in fluid communication with the regeneration air heat exchanger.

The method may also include passing the loop of regeneration air through a preheater disposed within the supply air channel. The method may also include passing the loop of regeneration air through a humidifier disposed within the supply air channel.

Certain embodiments provide a method of operating a heat pump system to heat a space and defrost a regeneration air heat exchanger disposed within a regeneration air channel. The method may include operating the heat pump system in a heating cycle for a first period of time, transitioning the heat pump system from the heating cycle to a defrost cycle after the first period of time, operating the heat pump system in the defrost cycle for a second period of time, and preventing frost from forming on the regeneration air heat exchanger through the operating the heat pump system in the defrost cycle for the second period of time. The method may also include transitioning the heat pump system back to the heating cycle after the second period of time.

BRIEF DESCRIPTION OF THE DRAWINGS

FIG. 3 is a table illustrating the performance of the heat pump system shown in FIG. 1 while operating in the winter mode.

FIG. 7 is a table illustrating the performance of the heat pump system shown in FIG. 5 while operating in the summer mode.

DETAILED DESCRIPTION OF THE INVENTION

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
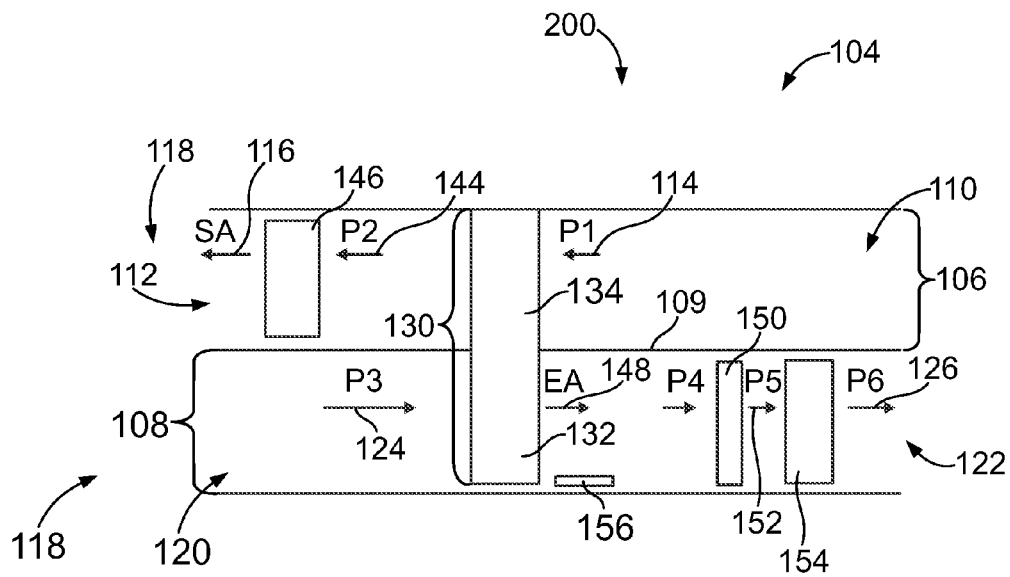
FIG. 1 is a schematic diagram of a heat pump system formed in accordance with an embodiment and operating in a winter mode.

FIG. 1 is a schematic diagram of a heat pump system 104 formed in accordance with an embodiment and operating in a winter mode 200. The heat pump system 104 is in fluid communication with a refrigerant system 102 (shown in FIG. 2). The heat pump system 104 is configured to exchange sensible and latent heat between a supply air channel 106 and a regeneration air channel 108. In one embodiment, the heat pump system 104 may be utilized to transfer only sensible heat. The supply air channel 106 is positioned adjacent to the regeneration air channel 108. The supply air channel 106 and the regeneration air channel 108 are separated by a partition 109. The supply air channel 106 extends between an inlet 110 and an outlet 112. The inlet 110 receives outside air 114. The outlet 112 discharges supply air 116 into a space 118. The space 118 may be a building, room, enclosed structure, or the like. The regeneration air channel 108 includes an inlet 120 and an outlet 122. The inlet 120 receives regeneration air 124. The regeneration air 124 may include return air from the space 118. The outlet discharges exhaust air 126 into the outside atmosphere.

An energy recovery module 130 extends between the regeneration air channel 108 and the supply air channel 106. In one embodiment, the heat pump system 104 may be an air-to-air heat pump that does not include the energy recovery module 130. The energy recovery module 130 includes a regeneration air side 132 and a supply air side 134. The regeneration air side 132 is positioned in the regeneration air channel 108. The supply air side 134 is positioned in the supply air channel 106. The energy recovery module 130 transfers sensible and latent heat between the regeneration air side 132 and the supply air side 134. The energy recovery module 130 transfers sensible and latent heat between the supply air channel 106 and the regeneration air channel 108. In one embodiment, the energy recovery module 130 may be a plate-type heat exchanger, an energy recovery wheel, heat pipe, enthalpy pump, or the like.

In one embodiment, the supply air channel 106 may include a preheater. It should be noted that the preheater is an optional component that may be excluded from the heat pump system 104. The preheater may be positioned upstream from the supply air side 134 of the energy recovery module 130. In one embodiment, the preheater receives and heats the outside air 114 to generate heated air. Optionally, the outside air 114 flows directly to the supply air side 134 of the energy recovery module 130. The present embodiment will be described with respect to a heat pump system 104 that excludes the preheater. Accordingly, the supply air side 134 of the energy recovery module receives the outside air 114. The energy recovery module 130 transfers heat and moisture between the outside air 114 in the supply air side 134 and the regeneration air 124 in the regeneration air side 132 to generate pre-conditioned outside air 144. The supply air stream includes a supply air heat exchanger 146 positioned downstream from the supply air side 134 of the energy recovery module 130. The supply air heat exchanger 146 receives the pre-conditioned outside air 144 and generates the supply air 116.

In the regeneration air channel 108, the regeneration air side 132 of the energy recovery module 130 receives the regeneration air 124. The energy recovery module 130 transfers sensible and latent heat between the regeneration air 124 in the regeneration air side 132 and the outside air 114 in supply air side 134 to generate pre-conditioned regeneration air 148. A pre-processing module 150 is positioned downstream from the regeneration air side 132 of the energy recovery module 130. In one embodiment, the pre-processing module 150 may be a heat exchanger or the like. The pre-processing module 150 receives and heats the pre-conditioned regeneration air 148 to generate pre-heated air 152. A regeneration air heat exchanger 154 is positioned downstream from the pre-processing module 150. In one embodiment, the pre-processing module 150 may be mounted to the regeneration air heat exchanger 154 within the same frame or casing. The regeneration air heat exchanger 154 receives the pre-heated air 152 and generates the exhaust air 126. The regeneration air heat exchanger 154 is fluidly coupled to the supply air heat exchanger 146. The regeneration air heat exchanger 154 and the supply air heat exchanger 146 transfer heat between the pre-heated air 152 and the pre-conditioned outside air 144.

The regeneration air channel 108 also includes a damper 156 positioned between the regeneration air side 132 of the energy recovery module 130 and the pre-processing module 150. The damper 156 may be opened to allow outside air to mix with the pre-conditioned regeneration air 148 prior to entering the pre-processing module 150.

In one embodiment, in the winter mode 200, the heat pump system 104 is capable of operating at temperatures as low as approximately 5° F. In other embodiments, the heat pump system 104 may be capable of operating at temperatures below approximately 5° F. In the winter mode 200, the regeneration air 124 includes warm humidified air and the outside air 114 includes cool dehumidified air.

The outside air 114 enters the inlet 110 of the supply air channel 106. The outside air 114 is channeled to the supply air side 134 of the energy recovery module 130. In one embodiment, the outside air 114 is first heated by a preheater prior to entering the supply air side 134 of the energy recovery module 130. In the supply air side 134 of the energy recovery module 130, the supply air 116 receives heat and moisture from the regeneration air 124 flowing through the regeneration air side 132 of the energy recovery module 130. The energy recovery module 130 generates warm humidified pre-conditioned outside air 144. The pre-conditioned outside air 144 flows downstream to the supply air heat exchanger 146. In the winter mode 200, the supply air heat exchanger 146 operates as a condenser to heat the pre-conditioned outside air 144. The supply air heat exchanger 146 receives heat from the regeneration air heat exchanger 154. The pre-conditioned outside air 144 receives heat from the supply air heat exchanger 146 to generate warm humidified supply air 116. The warm humidified supply air 116 is discharged into the space 118.

The regeneration air channel 108 receives the warm humidified regeneration air 124 from the space 118. The regeneration air 124 flows downstream to the regeneration air side 132 of the energy recovery module 130. The regeneration air side 132 of the energy recovery module 130 removes heat and moisture from the regeneration air 124. The heat and moisture is transferred to the supply air side 134 of the energy recovery module 130 to heat and humidify the outside air 114. The regeneration air side 132 of the energy recovery module 130 generates cool dehumidified pre-conditioned regeneration air 148. In the winter mode 200, the damper 156 is closed so that the pre-conditioned regeneration air 148 is not mixed with outside air. The pre-conditioned regeneration air 148 is channeled to the pre-processing module 150. In one embodiment, the pre-conditioned regeneration air 148 is channeled to the pre-processing module 150 when the outside air 114 has a temperature less than approximately 35° F. The pre-processing module 150 heats the pre-conditioned regeneration air 148 to generate pre-heated air 152. In one embodiment, when the heat pump system 104 is receiving outside air 114 that has a temperature greater than 35° F., the pre-processing module 150 may be shut-off so that the pre-conditioned regeneration air 148 flows through the pre-processing module 150 unchanged. In an alternative embodiment, the pre-conditioned air 148 by-passes the pre-processing module 150.

The pre-heated air 152 is channeled downstream to the regeneration air heat exchanger 154. In the winter mode 200, the regeneration air heat exchanger 154 operates as an evaporator to cool and dehumidify the pre-heated air 152 and generate cool dehumidified exhaust air 126. The cool dehumidified exhaust air 126 is discharged into the atmosphere. In an exemplary embodiment, the pre-processing module 150 heats the pre-conditioned regeneration air 148 to prevent frost formation on the regeneration air heat exchanger 154 during the winter mode 200. In particular, when operating the heat pump system 104 at outside air temperatures below approximately 35° F., frost may form on the regeneration air heat exchanger 154 as the regeneration air heat exchanger 154 generates the cool dehumidified exhaust air 126. Heating the pre-conditioned regeneration air 148 allows the regeneration air heat exchanger 154 to generate cool dehumidified exhaust air 126 that does not exceed a saturation point of the air. By preventing saturation of the cool dehumidified exhaust air 126, condensation does not form on the coils of the regeneration air heat exchanger 154. Accordingly, frost formation on the coils of the regeneration air heat exchanger 154 may be prevented by pre-heating the pre-conditioned regeneration air 148.

Figure 2:
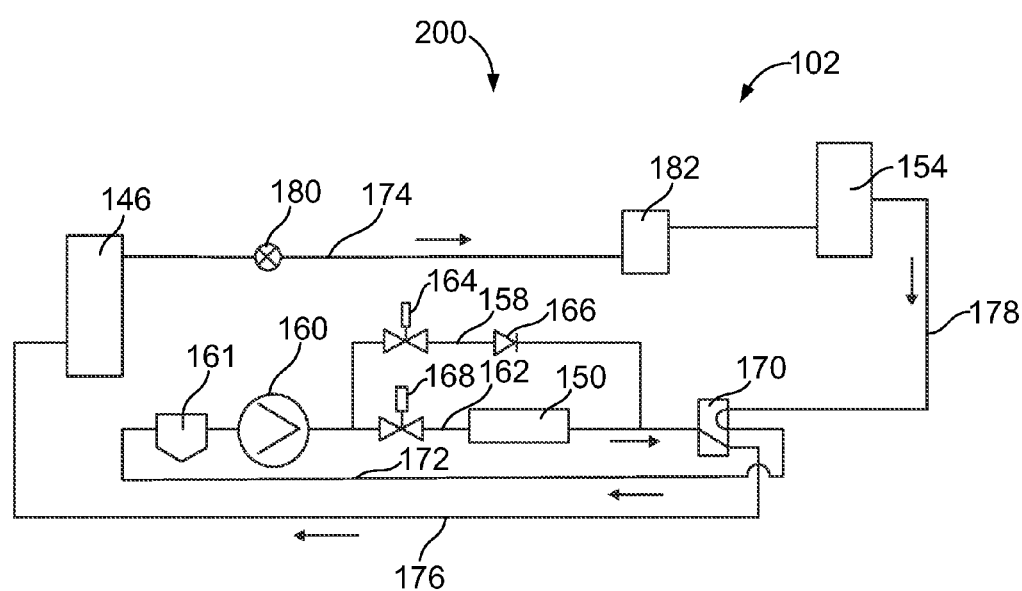
FIG. 2 is a schematic diagram of a refrigerant system formed in accordance with an embodiment and operating in the winter mode.

FIG. 2 is a schematic diagram of a refrigerant system 102 formed in accordance with an embodiment and operating in the winter mode 200. The refrigerant system 102 includes a refrigerant flowing therethrough. The refrigerant system 102 includes a compressor 160 that conditions the refrigerant to achieve the required temperature and pressure conditions for the refrigerant system 102. A suction accumulator 161 is positioned upstream of the compressor 160 to avoid a flow of liquid refrigerant into the compressor 160. In one embodiment, a suction accumulator may be positioned upstream of the compressor 160 to avoid a flow of liquid refrigerant into the compressor 160. A pre-processing circuit 162 and a bypass circuit 158 are positioned downstream of, and fluidly coupled to, the compressor 160. A bypass valve 164 and a check valve 166 are positioned within the bypass circuit 158. In one embodiment, a check valve may be positioned at the pre-processing module 150 outlet to avoid refrigerant migration. A pre-processing valve 168 and the pre-processing module 150 are positioned in the pre-processing circuit 162 so that the pre-processing module 150 is fluidly coupled to the compressor 160. In one embodiment, an additional refrigeration system control valve may be positioned downstream of the module 150. The bypass circuit 158 and the pre-processing circuit 162 are in fluid communication a four-way valve 170. An accumulator circuit 172 is in fluid communication between the four-way valve 170 and the suction accumulator 161.

A heat exchange circuit 174 is in fluid communication with the four way valve 170 and the heat pump system 104. The heat exchange circuit 174 includes a first end 176 and a second end 178. The first end 176 and the second end 178 of the heat exchange circuit 174 are both in fluid communication with the four-way valve so that the heat exchange circuit 174 both receives and returns refrigerant to the four-way valve 170. The supply air heat exchanger 146 and the regeneration air heat exchanger 154 are positioned within the heat exchange circuit 174. A valve 180 and a receiver 182 are positioned within the heat exchange circuit 174 between the supply air heat exchanger 146 and the regeneration air heat exchanger 154. It should be noted that the components illustrated in the refrigerant system 102 are exemplary only and the refrigerant system 102 may include other components.

The pre-processing module 150 is coupled in fluid communication with both the supply air heat exchanger 146 and the regeneration air heat exchanger 154. The pre-processing module 150 is fluidly coupled between the supply air heat exchanger 146 and the regeneration air heat exchanger 154 in a common refrigerant path through the refrigerant system 102.

In the winter mode 200, refrigerant in the compressor 160 flows downstream to at least one of the bypass circuit 158 or the pre-processing circuit 162. The bypass valve 164 and the pre-processing valve 168 are controlled based on a refrigerant requirement of the pre-processing module 150. For example, when operating at higher outside temperatures, the pre-processing module 150 requires less refrigerant flow. Accordingly, the bypass valve 164 and the pre-processing valve 168 are controlled to channel more refrigerant through the bypass circuit 158. As the outside temperature decreases, the pre-processing module 150 requires more refrigerant flow. Accordingly, the bypass valve 164 and the pre-processing valve 168 are controlled to channel more refrigerant through the pre-processing circuit 162. In one embodiment, when the outside temperature reaches approximately 5° F., the bypass valve 164 may be closed and the pre-processing valve 168 may be fully opened so that all of the refrigerant flows through the pre-processing circuit 162 and the pre-processing module 150. In one embodiment, an additional refrigerant flow control device may be positioned downstream of the module 150. The pre-processing module 150 heats the pre-conditioned regeneration air 148 in the regeneration air channel 108. The refrigerant in the bypass circuit 158 and the pre-processing circuit 162 then flows downstream to the four-way valve 170.

In the winter mode 200, the four-way valve 170 couples the bypass circuit 158 and the pre-processing circuit 162 in fluid communication with the first end 176. The refrigerant flows through the circuit 176 to the supply air heat exchanger 146. The refrigerant in the supply air heat exchanger 146 provides heat to the pre-conditioned outside air 144. Then, the refrigerant flows through the circuit 174 to the regeneration air heat exchanger 154. The regeneration air heat exchanger 154 receives heat from the pre-heated air 152. The refrigerant then flows downstream to the four-way valve 170. In the winter mode 200, the four-way valve 170 couples the second end 178 of the heat exchange circuit 174 to the accumulator circuit 172 to return the refrigerant from the heat exchange circuit 174 to the compressor 160.

FIG. 3 is a table 300 illustrating an exemplary embodiment of the performance of the heat pump system 104 while operating in the winter mode 200. The table 300 illustrates three operating conditions of the heat pump system 104. The operating conditions are illustrated with respect to a plurality of performance factors 302. The performance factors 302 include the temperature 304 of the outside air 114, the temperature 306 of the pre-conditioned outside air 144, the temperature 308 of the regeneration air 124, the temperature 310 of the pre-conditioned regeneration air 148, the temperature 312 of the pre-heated air 152, the temperature 314 of the exhaust air 126, and the temperature 316 of the supply air 116. The performance factors 302 also include a capacity 318 of the heat pump system 104, a compressor power consumption 320 of the heat pump system 104, a performance 322 of the heat pump system 104, a refrigerant saturation suction temperature 324, and a refrigerant condensing temperature 326.

In a first operating condition 328, the heat pump system 104 receives outside air 114 having a temperature 304 of 35° F. dry bulb and 33° F. wet bulb. The energy recovery module 130 heats and humidifies the outside air to generate pre-conditioned outside air 144 having a temperature 306 of 60.3° F. dry bulb and 46.9° F. wet bulb. The supply air heat exchanger 146 heats the pre-conditioned outside air 144 to generate supply air 116 having a temperature 316 of 87.7° F. dry bulb. In the first operating condition 328, the heat pump system 104 receives regeneration air 124 having a temperature 308 of 70° F. dry bulb with 25% humidity. The energy recovery module 130 cools and dehumidifies the regeneration air 124 to generate pre-conditioned regeneration air 148 having a temperature 310 of 44.7° F. dry bulb and 38.7° F. wet bulb. The pre-processing module 150 heats the pre-conditioned regeneration air 148 to generate pre-heated air 152 having a temperature 312 of 57.87° F. dry bulb and 45.38° F. wet bulb. The regeneration air heat exchanger 154 cools the pre-heated air 152 to generate exhaust air 126 having a temperature 314 of 28.29° F. dry bulb and 27.49° F. wet bulb.

During the first operating condition 328, the heat pump system 104 has a capacity 318 of 237.9 MBH and a compressor power consumption 320 of 21599.88 W. The coefficient of performance 322 for the heat pump system 104 is 3.2. A saturation suction temperature 324 and a condensing temperature 326 for the heat pump system 104 are 21.9° F. and 90.2° F., respectively.

In a second operating condition 330, the heat pump system 104 receives outside air 114 having a temperature 304 of 17° F. dry bulb and 15° F. wet bulb. The energy recovery module 130 heats and humidifies the outside air to generate pre-conditioned outside air 144 having a temperature 306 of 55.5° F. dry bulb and 43° F. wet bulb. The supply air heat exchanger 146 heats the pre-conditioned outside air 144 to generate supply air 116 having a temperature 316 of 76.7° F. dry bulb. In the second operating condition 330, the heat pump system 104 receives regeneration air 124 having a temperature 308 of 70° F. dry bulb with 25% humidity. The energy recovery module 130 cools and dehumidifies the regeneration air 124 to generate pre-conditioned regeneration air 148 having a temperature 310 of 31.5° F. dry bulb and 27.3° F. wet bulb. The pre-processing module 150 heats the pre-conditioned regeneration air 148 to generate pre-heated air 152 having a temperature 312 of 46.15° F. dry bulb and 36.1° F. wet bulb. The regeneration air heat exchanger 154 cools the pre-heated air 152 to generate exhaust air 126 having a temperature 314 of 21.2° F. dry bulb and 20.2° F. wet bulb.

During the second operating condition 330, the heat pump system 104 has a capacity 318 of 184 MBH and a compressor power consumption 320 of 19152 W. The coefficient of performance 322 for the heat pump system 104 is 2.8. A refrigerant saturation suction temperature 324 and a refrigerant condensing temperature 326 for the heat pump system 104 are 14° F. and 78.8° F., respectively.

In a third operating condition 332, the heat pump system 104 receives outside air 114 having a temperature 304 of 5° F. dry bulb and 3° F. wet bulb. The energy recovery module 130 heats and humidifies the outside air to generate pre-conditioned outside air 144 having a temperature 306 of 52.3° F. dry bulb and 40.9° F. wet bulb. The supply air heat exchanger 146 heats the pre-conditioned outside air 144 to generate supply air 116 having a temperature 316 of 73.2° F. dry bulb. In the third operating condition 332, the heat pump system 104 receives regeneration air 124 having a temperature 308 of 70° F. dry bulb with 25% humidity. The energy recovery module 130 cools and dehumidifies the regeneration air 124 to generate pre-conditioned regeneration air 148 having a temperature 310 of 22.7° F. dry bulb and 20.1° F. wet bulb. The pre-processing module 150 heats the pre-conditioned regeneration air 148 to generate pre-heated air 152 having a temperature 312 of 40° F. dry bulb and 30.5° F. wet bulb. The regeneration air heat exchanger 154 cools the pre-heated air 152 to generate exhaust air 126 having a temperature 314 of 17.7° F. dry bulb and 16.8° F. wet bulb.

During the third operating condition 332, the heat pump system 104 has a capacity 318 of 181.6 MBH and a compressor power consumption 320 of 18602 W. The coefficient of performance 322 for the heat pump system 104 is 2.9. A saturation suction temperature 324 and a condensing temperature 326 for the heat pump system 104 are 12.5° F. and 75.2° F., respectively.

Figure 4:
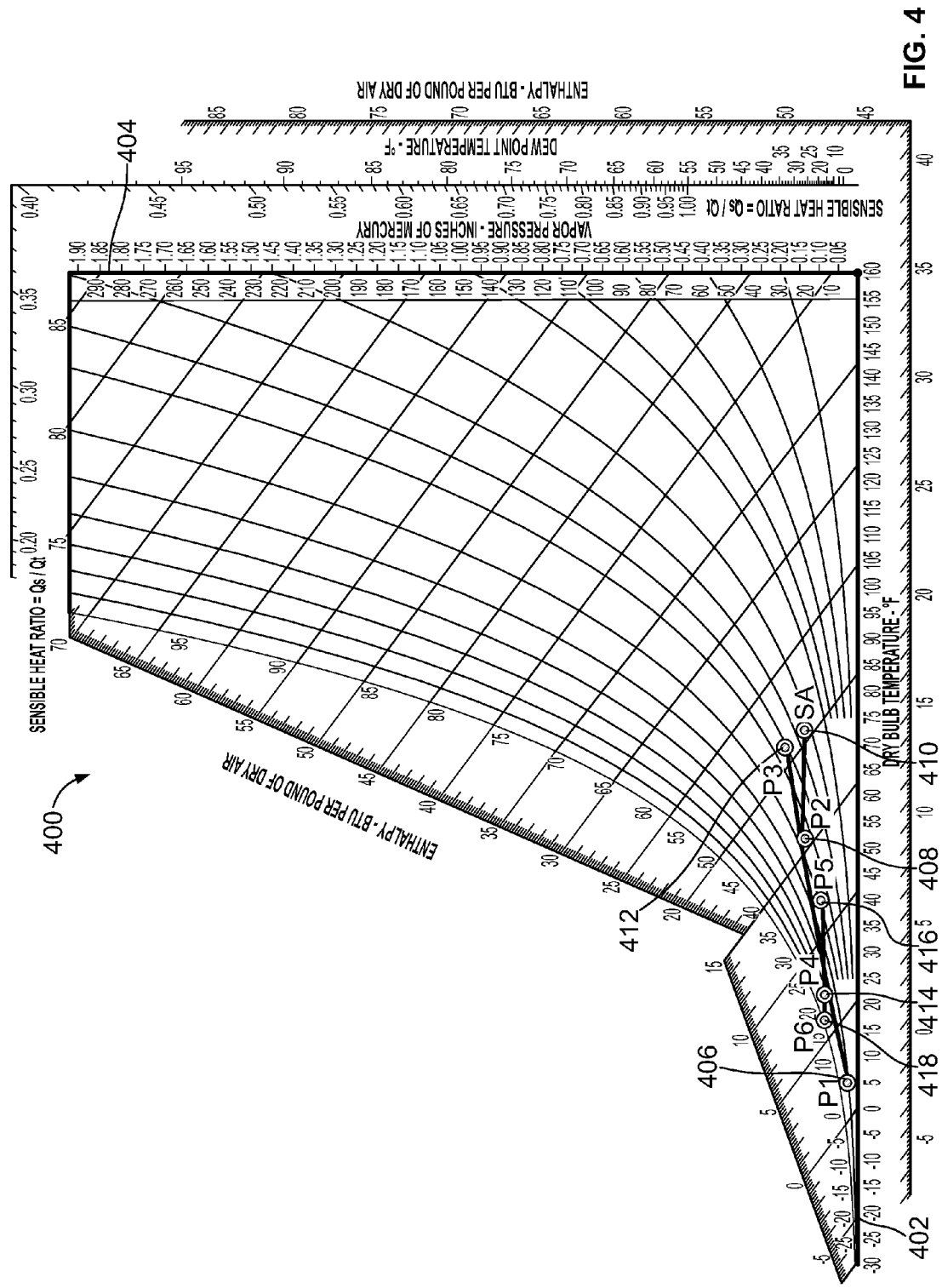
FIG. 4 is a psychrometric chart illustrating the performance of the heat pump shown in FIG. 1 while operating in the winter mode.

FIG. 4 is a psychrometric chart 400 illustrating the performance of the heat pump 104 while operating in the winter mode 200. The chart 400 illustrates the performance of the heat pump 104 when the outside air is 5° F. The chart 400 includes an x-axis 402 representing the dry-bulb temperature of the air in ° F. A y-axis 404 represents a humidity ratio of the air in grains of moisture per pounds of dry air.

The heat pump system 104 receives outside air 114 at point 406 having a temperature of 5° F. and a humidity ratio of 3.7. The energy recovery module 130 heats and humidifies the outside air to generate pre-conditioned outside air 144 at point 408 having a temperature of 52.3° F. and a humidity ratio of 19.8. The supply air heat exchanger 146 heats the pre-conditioned outside air 144 to generate supply air 116 at point 410 having a temperature of 73.2° F. and a humidity ratio of 19.8. The heat pump system 104 receives regeneration air 124 at point 412 having a temperature of 70° F. and a humidity ratio of 25. The energy recovery module 130 cools and dehumidifies the regeneration air 124 to generate pre-conditioned regeneration air 148 at point 414 having a temperature of 22.7° F. and a humidity ratio of 11.6. The pre-processing module 150 heats the pre-conditioned regeneration air 148 to generate pre-heated air 152 at point 416 having a temperature of 40° F. and a humidity ratio of 11.7. The regeneration air heat exchanger 154 cools the pre-heated air 152 to generate exhaust air 126 at point 418 having a temperature of 17.7° F. and a humidity ratio of 15.

Figure 5:
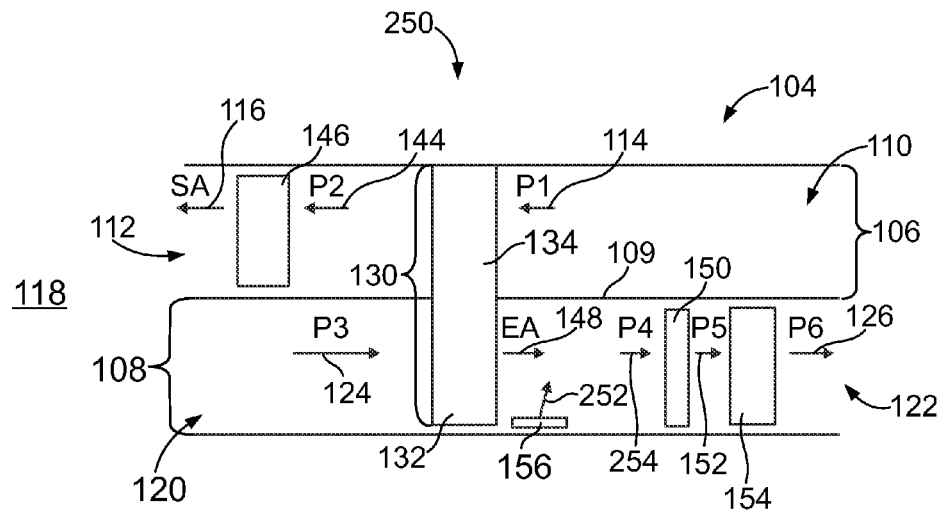
FIG. 5 is a schematic diagram of the heat pump system shown in FIG. 1 and operating in a summer mode.

FIG. 5 is a schematic diagram of the heat pump system 104 operating in a summer mode 250. In the summer mode 250, the regeneration air 124 includes cool dehumidified air and the outside air 114 includes warm humidified air.

The outside air 114 enters the inlet 110 of the supply air channel 106. The outside air 114 is channeled to the supply air side 134 of the energy recovery module 130. In the supply air side 134 of the energy recovery module 130, heat and moisture are removed from the supply air 116 and transferred to the regeneration air 124 flowing through the regeneration air side 132 of the energy recovery module 130. The energy recovery module 130 generates cool dehumidified pre-conditioned outside air 144. The pre-conditioned outside air 144 flows downstream to supply air heat exchanger 146. In the summer mode 250, the supply air heat exchanger 146 operates as an evaporator to cool the pre-conditioned outside air 144. The supply air heat exchanger 146 removes heat from the pre-conditioned outside air 144 and transfers the heat to the regeneration air heat exchanger 154. The supply air heat exchanger 146 to generates cool dehumidified supply air 116 that is discharged into the space 118.

The regeneration air channel 108 receives the cool dehumidified regeneration air 124 from the space 118. The regeneration air 124 flows downstream to the regeneration air side 132 of the energy recovery module 130. The cool dehumidified regeneration air 124 receives heat and moisture from the regeneration air side 132 of the energy recovery module 130. The heat and moisture is transferred from the supply air side 134 of the energy recovery module 130 to heat and humidify the cool dehumidified regeneration air 124. The regeneration air side 132 of the energy recovery module 130 generates warm humidified pre-conditioned regeneration air 148. In the summer mode 250, the damper 156 is opened so that the pre-conditioned regeneration air 148 is mixed with outside air 252 to generate mixed air 254. In other embodiments, the damper 156 may be modulated in the summer mode to control a refrigerant condensation temperature. The outside air 252 is added to the warm humidified pre-conditioned regeneration air 148 to control the refrigeration pressure in the refrigeration system 102. In one embodiment, controlling the refrigeration system pressure lowers a condensation temperature to improve the efficiency of the heat pump system 104.

The mixed air 254 is channeled to the pre-processing module 150. In one embodiment, the mixed air 254 may by-pass the pre-processing module 150. In one embodiment, the pre-processing module 150 and the regeneration air heat exchanger 154 may by-passed during a controlled free cooling mode, wherein the refrigerant system 102 is not operating. The pre-processing module 150 heats the mixed air 254 to generate the pre-heated air 152. The pre-heated air 152 is channeled downstream to the regeneration air heat exchanger 154. In the summer mode 250, the regeneration air heat exchanger 154 operates as a condenser to heat the pre-heated air 152 and generate warm exhaust air 126. The warm exhaust air 126 is discharged into the atmosphere. In an exemplary embodiment, the pre-processing module 150 heats the mixed air 254 to improve an efficiency of the regeneration air heat exchanger 154. Because the mixed air 254 is pre-heated by the pre-processing module 150, the regeneration air heat exchanger 154 requires a lower condensation temperature in the refrigeration system 102. A lower condensation temperature will improve the efficiency of the heat pump system 104.

Figure 6:
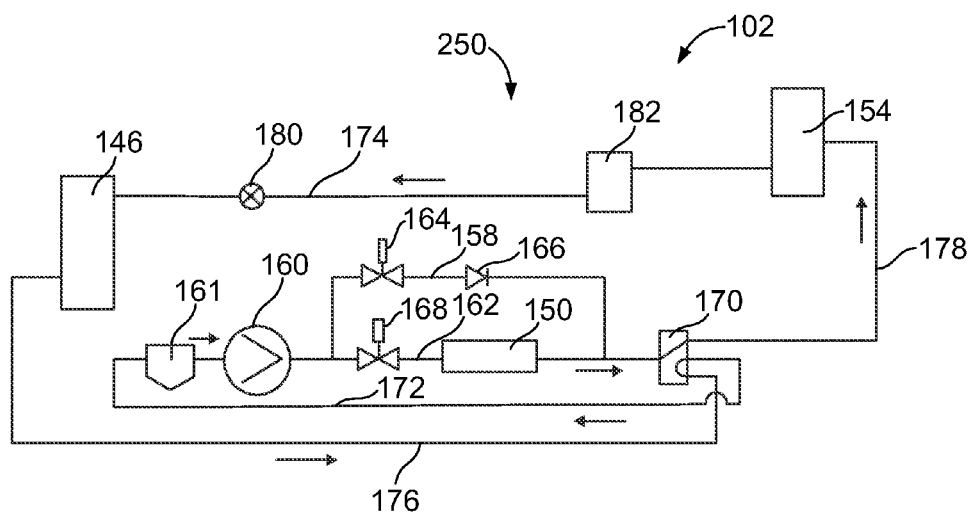
FIG. 6 is a schematic diagram of the refrigerant system shown in FIG. 2 and operating in the summer mode.

FIG. 6 is a schematic diagram of the refrigerant system 102 operating in the summer mode 250. In the summer mode 250, the bypass valve 164 is entirely closed and the pre-processing valve 168 is entirely opened or modulated. The refrigerant in the compressor 160 flows downstream to the pre-processing circuit 162 and the pre-processing module 150. The pre-processing module 150 heats the pre-conditioned regeneration air 148 in the regeneration air channel 108. The refrigerant in the pre-processing module 150 then flows downstream to the four-way valve 170.

In the summer mode 250, the four-way valve 170 couples the pre-processing circuit 162 in fluid communication with the second end 178 of the heat exchange circuit 174. The refrigerant flow in the regeneration air heat exchanger 154 transfers heat to the pre-heated air 152. The refrigerant in the supply air heat exchanger 146 receives heat from the pre-conditioned outside air 144. The refrigerant then flows downstream to the four-way valve 170. In the summer mode 250, the four-way valve 170 couples the first end 176 of the heat exchange circuit 174 to the accumulator circuit 172 to return the refrigerant from the heat exchange circuit 174 to the compressor 160.

FIG. 7 is a table 500 illustrating the performance of the heat pump system 104 while operating in the summer mode 250. The table 500 illustrates two operating conditions of the heat pump system 104. The operating conditions are illustrated with respect to a plurality of performance factors 502. The performance factors 502 include the temperature 504 of the outside air 114, the temperature 506 of the pre-conditioned outside air 144, the temperature 508 of the regeneration air 124, the temperature 510 of the pre-conditioned regeneration air 148, the temperature 512 of the pre-heated air 152, and the temperature 516 of the supply air 116. The performance factors 302 also include a supply air flow capacity 518, a condenser air flow capacity 520, a compressor power consumption 522, an energy efficiency ratio 524 of the compressor 160, a refrigerant saturation suction temperature 526, a refrigerant condensing temperature 528, and a cooling capacity 529 of the supply air heat exchanger 146.

In a first operating condition 530, the heat pump system 104 does not include the pre-processing module 150. The heat pump system 104 receives outside air 114 having a temperature 504 of 95° F. dry bulb and 78° F. wet bulb. The energy recovery module 130 cools and dehumidifies the outside air 114 to generate pre-conditioned outside air 144 having a temperature 506 of 80.8° F. dry bulb and 68.5° F. wet bulb. The supply air heat exchanger 146 cools the pre-conditioned outside air 144 to generate supply air 116 having a temperature 516 of 52.6° F. dry bulb and 52.6° F. wet bulb. In the first operating condition 530, the heat pump system 104 receives regeneration air 124 having a temperature 508 of 75° F. dry bulb and 63° F. wet bulb. The energy recovery module 130 heats and humidifies the regeneration air 124 to generate pre-conditioned regeneration air 148 having a temperature 510 of 91.68° F. dry bulb. In the first operating condition 530, the heat pump system 104 does not include the pre-processing module 150. Accordingly, the temperature 512 of the pre-heated air 152 is the same as the temperature 510 of the pre-conditioned regeneration air 148, 91.68° F. dry bulb. The regeneration air heat exchanger 154 heats the pre-conditioned regeneration air 148.

During the first operating condition 530, the heat pump system 104 has a supply air flow capacity 518 and a condenser air flow capacity 520 of 8000 and 14000, respectively. A compressor power consumption 522 of the heat pump system 104 is 32568.44 W and an energy efficiency ratio 524 of the compressor 160 is 11.9. The saturation suction temperature 526 and the condensing temperature 528 of the heat pump system 104 are 47.15° F. and 127.5° F., respectively. The supply air heat exchanger 146 has a cooling capacity 529 of 388 MBH.

In a second operating condition 532, the heat pump system 104 includes the pre-processing module 150. The heat pump system 104 receives outside air 114 having a temperature 504 of 95° F. dry bulb and 78° F. wet bulb. The energy recovery module 130 cools and dehumidifies the outside air 114 to generate pre-conditioned outside air 144 having a temperature 506 of 80.8° F. dry bulb and 68.5° F. wet bulb. The supply air heat exchanger 146 cools the pre-conditioned outside air 144 to generate supply air 116 having a temperature 516 of 51.94° F. dry bulb and 51.94° F. wet bulb. In the second operating condition 532, the heat pump system 104 receives regeneration air 124 having a temperature 508 of 75° F. dry bulb and 63° F. wet bulb. The energy recovery module 130 heats and humidifies the regeneration air 124 to generate pre-conditioned regeneration air 148 having a temperature 510 of 91.68° F. dry bulb. The pre-processing module 150 heats the pre-conditioned regeneration air 148 to generate pre-heated air 152 having a temperature 512 of 97.65° F. dry bulb. The regeneration air heat exchanger 154 heats the pre-heated air 152.

During the second operating condition 532, the heat pump system 104 has a supply air flow capacity 518 and a condenser air flow capacity 520 of 8000 and 14000, respectively. A compressor power consumption 522 of the heat pump system 104 is 31400 W and an energy efficiency ratio 524 of the compressor 160 is 12.7. The saturation suction temperature 526 and the condensing temperature 528 of the heat pump system 104 are 46.69° F. and 123.7° F., respectively. The supply air heat exchanger 146 has a cooling capacity 529 of 399.7 MBH.

Figure 8:
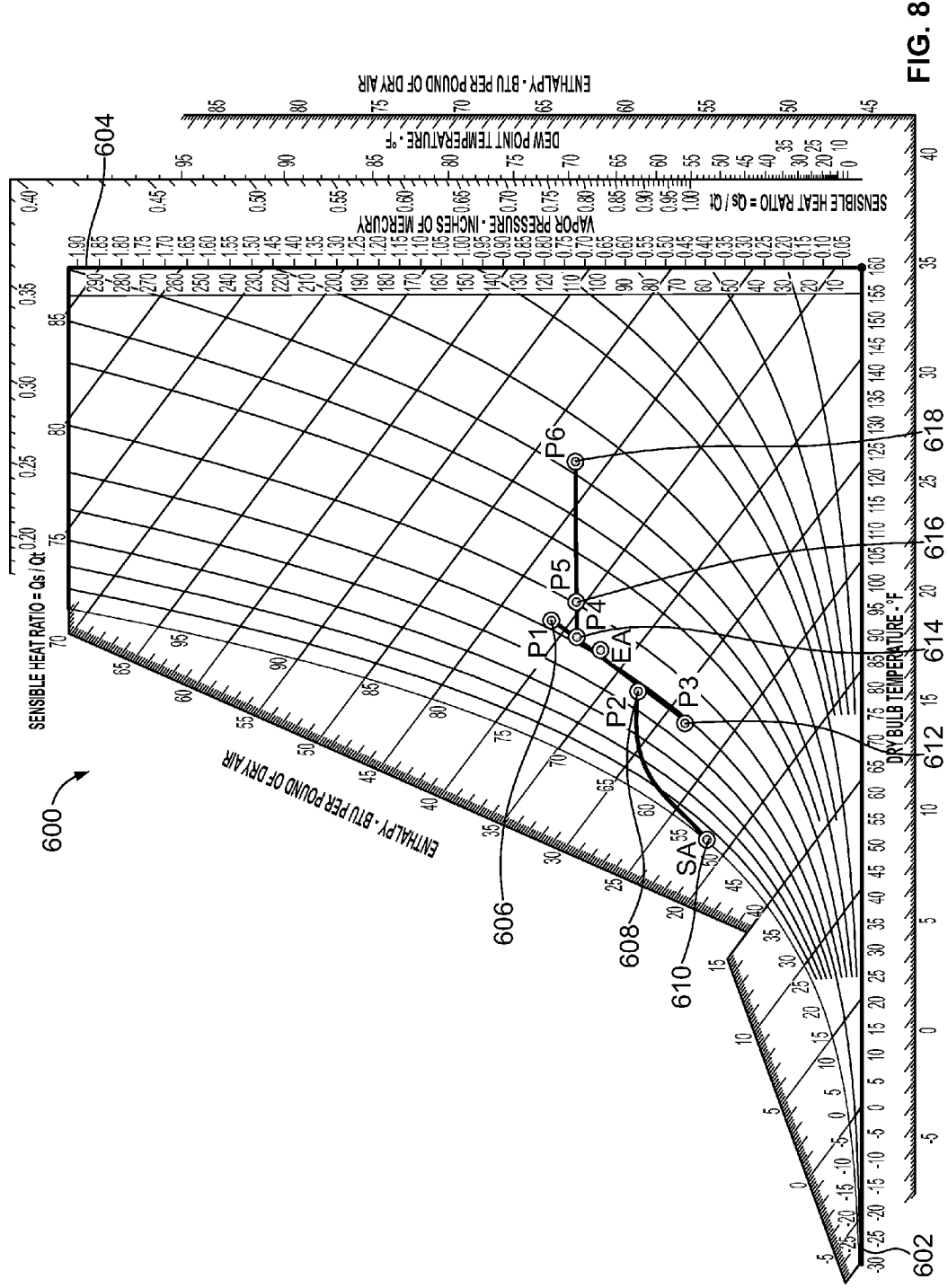
FIG. 8 is a psychrometric chart illustrating the performance of the heat pump shown in FIG. 5 while operating in the summer mode.

FIG. 8 is a psychrometric chart 600 illustrating the performance of the heat pump shown 104 while operating in the summer mode 250. The chart 600 illustrates the performance of the heat pump 104 when the outside air is 95° F. The chart 600 includes an x-axis 602 representing the dry-bulb temperature of the air in ° F. A y-axis 604 represents a humidity ratio of the air in grains of moisture per pounds of dry air.

The heat pump system 104 receives outside air 114 at point 606 having a temperature of 95° F. and a humidity ratio of 120. The energy recovery module 130 cools and dehumidifies the outside air 114 to generate pre-conditioned outside air 144 at point 608 having a temperature of 80.8° F. and a humidity ratio of 85. The supply air heat exchanger 146 cools the pre-conditioned outside air 144 to generate supply air 116 at point 610 having a temperature of 51.94° F. and a humidity ratio of 58.

The heat pump system 104 receives regeneration air 124 at point 612 having a temperature of 75° F. and a humidity ratio of 67. The energy recovery module 130 heats and humidifies the regeneration air 124 to generate pre-conditioned regeneration air 148 at point 614 having a temperature of 91.68° F. and a humidity ratio of 98. The pre-processing module 150 heats the mixed air including the outside air to generate pre-heated air 152 at point 616 having a temperature of 97.65° F. and a humidity ratio of 98. The regeneration air heat exchanger 154 heats the pre-heated air 152 to generate exhaust air 126 at point 618 having a temperature of 123.7 F and a humidity ratio of 98.

Figure 9:
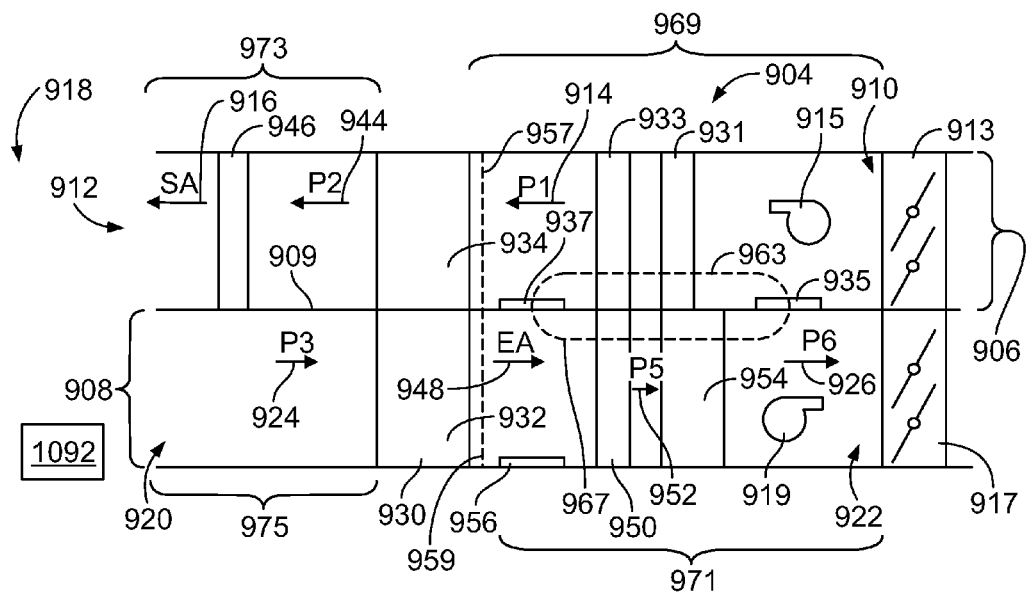
FIG. 9 is a schematic diagram of a heat pump system formed in accordance with an embodiment.

FIG. 9 is a schematic diagram of a heat pump system 904 formed in accordance with an embodiment. The heat pump system 904 is in fluid communication with a refrigerant system 1002 (shown in FIG. 10). The heat pump system 904 is configured to exchange sensible and latent heat between a supply air channel 906 and a regeneration air channel 908. In one embodiment, the heat pump system 904 may be utilized to transfer only sensible heat. The supply air channel 906 is positioned adjacent to the regeneration air channel 908. The supply air channel 906 and the regeneration air channel 908 are separated by a partition 909. The supply air channel 906 extends between an inlet 910 and an outlet 912. A supply air damper 913 may be disposed at the inlet 910. When the air damper 913 is opened, the inlet 910 receives outside air 914. The outlet 912 discharges supply air 916 into a space 918. The space 918 may be a building, room, enclosed structure, or the like. A fan 915 may be disposed within the supply air channel 906. The fan 915 is configured to move the outside air 914 through the supply air channel 906. The fan 915 may be positioned proximate the inlet 910, as shown. Optionally, the fan 915 may be positioned proximate the outlet 912. Further, the heat pump system 904 may include more than one fan 915 within the supply air channel 906.

The regeneration air channel 908 includes an inlet 920 and an outlet 922. The inlet 920 receives regeneration air 924. The regeneration air 924 may include return air from the space 918. An exhaust air damper 917 may be disposed at the outlet 922. When the exhaust air damper 917 is opened, the outlet 922 discharges exhaust air 926 into the outside atmosphere. A fan 919 may be disposed within the regeneration air channel 908. The fan 919 is configured to move the exhaust air 926 through the regeneration air channel 908. Than fan 919 may be positioned proximate the outlet 922, as shown. Optionally, the fan 919 may be positioned proximate the inlet 920. Further, the heat pump system 904 may include more than one fan 919 within the regeneration air channel 908.

An energy recovery module 930 extends between the regeneration air channel 908 and the supply air channel 906. In one embodiment, the heat pump system 904 may be an air-to-air heat pump that does not include the energy recovery module 930. The energy recovery module 930 includes a regeneration air side 932 and a supply air side 934. The regeneration air side 932 is positioned in the regeneration air channel 908. The supply air side 934 is positioned in the supply air channel 906. The energy recovery module 930 may transfer sensible and latent heat between the regeneration air side 932 and the supply air side 934. The energy recovery module 930 transfers sensible and latent heat between the supply air channel 906 and the regeneration air channel 908.

The energy recovery module 930 may be one or more of various types of energy recovery devices, such as, for example, an enthalpy wheel, a sensible wheel, a desiccant wheel, a plate heat exchanger, a plate energy (heat and moisture) exchanger, a heat pipe, a run-around loop, a passive RAMEE, or the like.

An enthalpy wheel is a rotary air-to-air heat exchanger. If the energy recovery module 930 includes an enthalpy wheel, air within the supply air channel 906 passes in a direction counter-flow to the air within the regeneration air channel 908. The wheel may be formed of a heat-conducting material with an optional desiccant coating.

In general, the wheel may be filled with an air permeable material resulting in a large surface area. The surface area is the medium for sensible energy transfer. As the wheel rotates between the supply air channel 906 and the regeneration air channel 908, the wheel picks up heat energy and releases it into the colder air stream. Enthalpy exchange may be accomplished through the use of desiccants on an outer surface of the wheel. Desiccants transfer moisture through the process of adsorption, which is driven by the difference in the partial pressure of vapor within the opposing air streams.

Additionally, the rotational speed of the wheel also changes the amount of heat and moisture transferred. A slowly-turning desiccant coated wheel primarily transfers moisture. A faster turning desiccant coated wheel provides for both heat and moisture transfer.

Optionally, the energy recovery module 930 may be a sensible wheel, a plate exchanger, a heat pipe, a run-around apparatus, a refrigeration loop having a condenser and evaporator, a chilled water coil, or the like.

Alternatively, the energy recovery module 930 may be a flat plate exchanger. A flat plate exchanger is generally a fixed plate that has no moving parts. The exchanger may include alternating layers of plates that are separated and sealed. Because the plates are generally solid and non-permeable, only sensible energy is transferred. Optionally, the plates may be made from a selectively permeable material that allows for both sensible and latent energy transfer.

Also, the energy recovery module 930 may be a heat exchanger, such as shown and described in U.S. application Ser. No. 12/910,464 entitled "Heat Exchanger for an Equipment Rack," filed Oct. 22, 2010, which is hereby incorporated by reference in its entirety.

Alternatively, the energy recovery module 930 may be a run-around loop or coil. A run-around loop or coil includes two or more multi-row finned tube coils connected to each other by a pumped pipework circuit. The pipework is charged with a heat exchange fluid, typically water or glycol, which picks up heat from the exhaust air coil and transfers the heat to the supply air coil before returning again. Thus, heat from an exhaust air stream is transferred through the pipework coil to the circulating fluid, and then from the fluid through the pipework coil to the supply air stream.

Also, alternatively, the energy recovery module 930 may be a heat pipe. A heat pipe includes a sealed pipe or tube made of a material with a high thermal conductivity such as copper or aluminum at both hot and cold ends. A vacuum pump is used to remove all air from the empty heat pipe, and then the pipe is filled with a fraction of a percent by volume of coolant, such as water, ethanol, etc. Heat pipes contain no mechanical moving parts. Heat pipes employ evaporative cooling to transfer thermal energy from one point to another by the evaporation and condensation of a working fluid or coolant.

Referring again to FIG. 9, a humidifier 931 and a pre-heater 933 may be disposed within the supply air channel 906 upstream from the energy recovery module 930. Additionally, a recirculation damper 935 may be disposed within the partition 909 within the supply air channel 906 upstream from the humidifier 931 and the pre-heater 933. When the recirculation damper 935 is closed, exhaust air 926 remains in the regeneration air channel 908. When the recirculation damper 935 is opened, at least a portion of exhaust air 926 within the regeneration air channel 908 passes into the supply air channel 906 at a point that is upstream from the humidifier 931 and the pre-heater 933. Optionally, the heat pump system 904 may omit the humidifier 931.

Similarly, a recirculation damper 937 may be disposed within the partition 909 within the supply air channel 906 upstream from the energy recovery module, but downstream from the preheater 933 and the humidifier 931. When the recirculation damper 937 is closed, air within the supply air channel 906 remains in the supply air channel 906. However, when the recirculation damper 937 is opened, at least a portion of air within the supply air channel 906 passes into the regeneration air channel 908 downstream from the energy recovery module 930.

During a winter mode of operation, the preheater 931 may be used to heat the outside air 914 before it encounters the energy recovery module 930. Further, the humidifier 933 may humidify the outside air 914 before it encounters the energy recovery module 930. It should be noted, however, that the preheater 931 and the humidifier are optional components that may be excluded from the heat pump system 904.

The supply air side 934 of the energy recovery module 930 receives the outside air 914, which may be pre-heated by the preheater 931 and/or humidified by the humidifier 933. The energy recovery module 930 transfers heat and moisture between the outside air 914 in the supply air side 934 and the regeneration air 924 in the regeneration air side 932 to generate pre-conditioned outside air 944. A supply air heat exchanger 946 is positioned within the supply air channel 906 downstream from the energy recovery module 930. The supply air heat exchanger 946 receives the pre-conditioned outside air 944 and generates the supply air 916.

In the regeneration air channel 908, the regeneration air side 932 of the energy recovery module 930 receives the regeneration air 924. The energy recovery module 930 transfers sensible and latent heat between the regeneration air 924 in the regeneration air side 932 and the outside air 914 in supply air side 934 to generate pre-conditioned regeneration air 948. Within the regeneration air channel 908, a pre-processing module 950 is positioned downstream from the regeneration air side 932 of the energy recovery module 930. In one embodiment, the pre-processing module 950 may be a heat exchanger or the like. The pre-processing module 950 receives and heats the pre-conditioned regeneration air 948 to generate pre-heated air 952. A regeneration air heat exchanger 954 is positioned downstream from the pre-processing module 950. In one embodiment, the pre-processing module 950 may be mounted to the regeneration air heat exchanger 954 within the same frame or casing. The regeneration air heat exchanger 954 receives the pre-heated air 952 and generates the exhaust air 926. The regeneration air heat exchanger 954 is fluidly coupled to the supply air heat exchanger 946. The regeneration air heat exchanger 954 and the supply air heat exchanger 946 transfer heat between the pre-heated air 952 and the pre-conditioned outside air 944.

The regeneration air channel 908 also includes a damper 956 positioned between the regeneration air side 932 of the energy recovery module 930 and the pre-processing module 950. The damper 956 may be opened to allow outside air to mix with the pre-conditioned regeneration air 948 prior to entering the pre-processing module 950.

In the winter mode, the regeneration air 924 includes warm humidified air and the outside air 914 includes cool dehumidified air.

The outside air 914 enters the inlet 910 of the supply air channel 906 through the opened damper 913. The outside air 914 may then be heated by the preheater 931 and humidified by the humidifier before being channeled to the supply air side 934 of the energy recovery module 930. In the supply air side 934 of the energy recovery module 930, the supply air 916 receives heat and moisture from the regeneration air 924 flowing through the regeneration air side 932 of the energy recovery module 930. The energy recovery module 930 generates warm humidified pre-conditioned outside air 944. The pre-conditioned outside air 944 flows downstream to the supply air heat exchanger 946. In the winter mode, the supply air heat exchanger 946 operates as a condenser to heat the pre-conditioned outside air 944. The supply air heat exchanger 946 receives heat from the regeneration air heat exchanger 954. The pre-conditioned outside air 944 receives heat from the supply air heat exchanger 946 to generate warm humidified supply air 916. The warm humidified supply air 916 is discharged into the space 918.

The regeneration air channel 908 receives the warm humidified regeneration air 924 from the space 918. The regeneration air 924 flows downstream to the regeneration air side 932 of the energy recovery module 930. The regeneration air side 932 of the energy recovery module 930 removes heat and moisture from the regeneration air 924. The heat and moisture is transferred to the supply air side 934 of the energy recovery module 930 to heat and humidify the outside air 914. The regeneration air side 932 of the energy recovery module 930 generates cool dehumidified pre-conditioned regeneration air 948. In the winter mode, the damper 956 is selectively opened or close so that outside air may mix (or not mix) with the pre-conditioned regeneration air 948, depending on control demand. The pre-conditioned regeneration air 948 is channeled to the pre-processing module 950. In one embodiment, the pre-conditioned regeneration air 948 is channeled to the pre-processing module 950 when the outside air 914 has a temperature less than approximately 35° F. The pre-processing module 950 heats the pre-conditioned regeneration air 948 to generate the pre-heated air 952. In one embodiment, when the heat pump system 904 is receiving outside air 914 that has a temperature greater than 35° F., the pre-processing module 950 may be shut-off so that the pre-conditioned regeneration air 948 flows through the pre-processing module 950 unchanged. Optionally, the pre-conditioned air 948 may bypass the pre-processing module 950.

The pre-heated air 952 is channeled downstream to the regeneration air heat exchanger 954. In the winter mode, the regeneration air heat exchanger 954 operates as an evaporator to cool and dehumidify the pre-heated air 952 and generate cool dehumidified exhaust air 926. The cool dehumidified exhaust air 926 is discharged into the atmosphere when the damper 917 is opened. In an exemplary embodiment, the pre-processing module 950 heats the pre-conditioned regeneration air 948 to prevent frost formation on the regeneration air heat exchanger 954 during the winter mode. In particular, when operating the heat pump system 904 at outside air temperatures below approximately 35° F., frost may form on the regeneration air heat exchanger 954 as the regeneration air heat exchanger 954 generates the cool dehumidified exhaust air 926. Heating the pre-conditioned regeneration air 948 allows the regeneration air heat exchanger 954 to generate cool dehumidified exhaust air 926 that does not exceed a saturation point of the air. By preventing saturation of the cool dehumidified exhaust air 926, condensation does not form on the coils of the regeneration air heat exchanger 954. Accordingly, frost formation on the coils of the regeneration air heat exchanger 954 may be prevented by pre-heating the pre-conditioned regeneration air 948.

Also, as explained below, the dampers 913, 917, and 956 may be closed, while the dampers 935 and 937 are opened in order to provide a recirculation loop 963 of exhaust air that is used to defrost the regeneration air heat exchanger 954. As such, an additional damper 957 may be positioned within the air supply channel 906 just upstream from the energy recovery module 930, and another damper 959 may be positioned within the regeneration air channel 908 just downstream from the energy recovery module 930. The additional dampers may be closed during the defrost cycle when the dampers 913, 917, and 956 are also closed, and the recirculation dampers 935 and 937 are opened.

Figure 10:
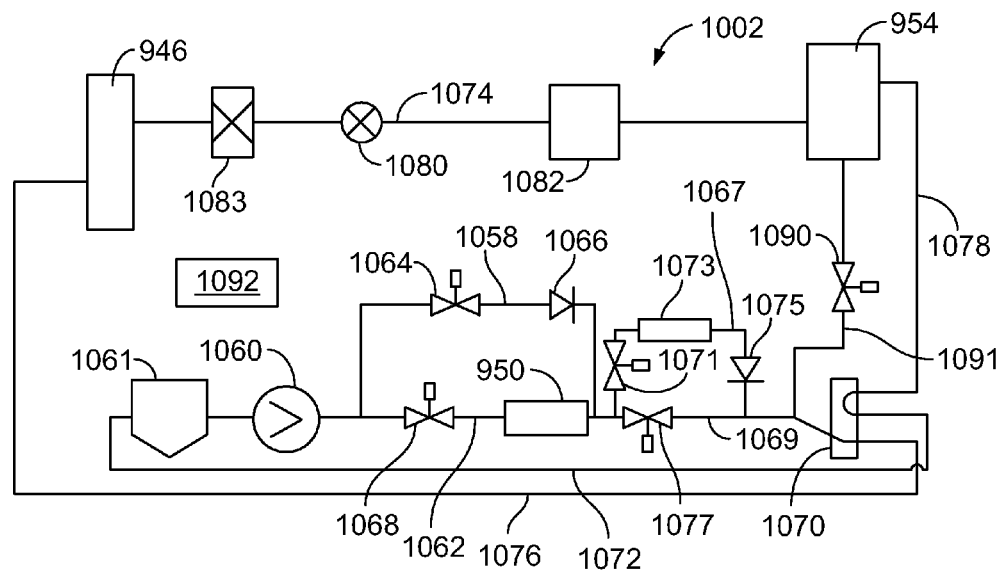
FIG. 10 is a schematic diagram of a refrigerant system formed in accordance with an embodiment.

FIG. 10 is a schematic diagram of the refrigerant system 1002 formed in accordance with an embodiment. The refrigerant system 1002 includes a refrigerant flowing therethrough. The refrigerant system 1002 includes a compressor 1060, such as a scroll or various other kinds of compressor, that conditions the refrigerant to achieve the required temperature and pressure conditions for the refrigerant system 1002. A suction accumulator 1061, which may include a crankcase heater, is positioned upstream of the compressor 1060 to avoid a flow of liquid refrigerant into the compressor 1060. A pre-processing circuit 1062 and a bypass circuit 1058 are positioned downstream of, and fluidly coupled to, the compressor 1060. A bypass valve 1064 and a check valve 1066 are positioned within the bypass circuit 1058. In one embodiment, the check valve 1066 may be positioned at the pre-processing module 950 outlet to avoid refrigerant migration. A pre-processing valve 1068 and the pre-processing module 950 are positioned in the pre-processing circuit 1062 so that the pre-processing module 950 is fluidly coupled to the compressor 1060. Optionally, a refrigerant conduit may be positioned just downstream from the pre-processing module 950 and connect to a point just upstream from the accumulator 1061. A valve may be positioned within the refrigerant line. When the valve is opened, liquid refrigerant may pass directly from the pre-processing module 950 back to the accumulator 1061. When the valve is closed, the liquid refrigerant passes out of the pre-processing circuit 1062 toward a pass-through circuit 1069.

A hot gas bypass circuit 1067 and the pass-through circuit 1069 are positioned between the pre-processing module 950 and a four way valve 1070. Optionally, the hot gas bypass circuit 1067 and the pass-through circuit 1069 may be positioned between the compressor 1060 and the pre-processing module 950. The hot gas bypass circuit 1067 includes a bypass valve 1071 upstream from a hot gas reheat coil 1073, which is upstream from a check valve 1075. A valve 1077 is disposed within the pass-through circuit 1069. When the valve 1077 is opened and the bypass valve 1071 is closed, refrigerant flows from the pre-processing module 950 to the four way valve 1070. When the valve 1077 is closed and the valve 1071 is opened, refrigerant passes into the hot gas reheat coil 1073 before passing to the four way valve 1070. Optionally, a refrigerant conduit may be positioned just downstream from the hot gas reheat coil 1073 and connect to a point just upstream from the accumulator 1061. A valve may be positioned within the refrigerant line. When the valve is opened, liquid refrigerant may pass directly from the hot gas reheat coil 1073 back to the accumulator 1061. When the valve is closed, the liquid refrigerant passes out of the hot gas reheat coil 1073 toward the four way valve 1070.

The bypass circuit 1058, the pre-processing circuit 1062, the hot gas bypass circuit 1067 and the pass-through circuit 1069 define one or more refrigerant paths, conduits, or the like that link the accumulator and the compressor 1060 to the four way valve 1070. An accumulator circuit 1072 is in fluid communication between the four-way valve 1070 and the suction accumulator 1061.

A heat exchange circuit 1074 is in fluid communication with the four way valve 1070 and the heat pump system 904 (shown in FIG. 1). The heat exchange circuit 1074 includes a first end 1076 and a second end 1078. The first end 1076 and the second end 1078 of the heat exchange circuit 1074 are both in fluid communication with the four-way valve 1070 so that the heat exchange circuit 1074 both receives and returns refrigerant to the four-way valve 1070. The supply air heat exchanger 946 and the regeneration air heat exchanger 954 are positioned within the heat exchange circuit 1074. A valve 1080 and a receiver 1082 are positioned within the heat exchange circuit 1074 between the supply air heat exchanger 946 and the regeneration air heat exchanger 954. Optionally, a refrigerant filter and/or drier may be disposed within the heat exchange circuit 1074, such as between the valve 1080 and the receiver 1082.

Additionally, a head pressure control valve 1083 may be positioned within the heat exchange circuit 1074 between the supply heat exchanger 946 and the valve 1080. The head pressure control valve 1083 is configured to control pressure in the system 1002 between the supply air heat exchanger 946 and the compressor 1060. The head pressure control valve 1083 is operable to maintain refrigerant discharge pressure and/or temperature at the compressor 1060 at a particular set-point. Overall, the head pressure control valve 1083 prevents the compressor 1060 from operating outside of an operating envelope, and ensures that the valve 1080 works properly. For example, in a low temperature heating operation, when the pre-processing module 950 is activated, the condensing temperature may be out of the functional working scope of the compressor 1060. Therefore, the head pressure control valve 1083 is engaged, thereby allowing the refrigerant system 1002 to properly function.

It should be noted that the components illustrated in the refrigerant system 1002 are exemplary only and the refrigerant system 1002 may include additional components, such as additional valves, check valves, pressure switches, and the like.

The pre-processing module 950 is coupled in fluid communication with both the supply air heat exchanger 946 and the regeneration air heat exchanger 954. The pre-processing module 950 is fluidly coupled between the supply air heat exchanger 946 and the regeneration air heat exchanger 954 in a common refrigerant path through the refrigerant system 1002.

In the winter mode, refrigerant in the compressor 1060 flows downstream to at least one of the bypass circuit 1058 or the pre-processing circuit 1062. The bypass valve 1064 and the pre-processing valve 1068 are controlled based on a refrigerant requirement of the pre-processing module 950. For example, when operating at higher outside temperatures, the pre-processing module 950 requires less refrigerant flow. Accordingly, the bypass valve 1064 and the pre-processing valve 168 are controlled to channel more refrigerant through the bypass circuit 1058. As the outside temperature decreases, the pre-processing module 950 requires more refrigerant flow. Accordingly, the bypass valve 1064 and the pre-processing valve 1068 are controlled to channel more refrigerant through the pre-processing circuit 1062. In one embodiment, when the outside temperature reaches approximately 5° F., the bypass valve 1064 may be closed and the pre-processing valve 1068 may be fully opened so that all of the refrigerant flows through the pre-processing circuit 1062 and the pre-processing module 950. Optionally, an additional refrigerant flow control device may be positioned downstream of the pre-processing module 950. For example, the valve 1077 may be closed and the valve 1071 opened to allow refrigerant to pass through the hot gas reheat coil 1073. If the temperature of the refrigerant downstream from the pre-processing module 950 is suitable, however, the valve 1077 is opened, while the valve 1071 is closed, so that the refrigerant pass directly to the four-way valve 1070. In general, the pre-processing module 950 (and optionally, the hot gas reheat coil 1073) heats the pre-conditioned regeneration air 948 in the regeneration air channel 908 (shown in FIG. 9). The refrigerant in the bypass circuit 1058 and the pre-processing circuit 1062 then flows downstream to the four-way valve 1070.

In the winter mode, the four-way valve 1070 couples the bypass circuit 1058 and the pre-processing circuit 1062 in fluid communication with the first end 1076. The refrigerant flows through the circuit 1076 to the supply air heat exchanger 946. The refrigerant in the supply air heat exchanger 946 provides heat to the pre-conditioned outside air 944. Then, the refrigerant flows through the circuit 1074 to the regeneration air heat exchanger 954. The regeneration air heat exchanger 954 receives heat from the pre-heated air 952. The refrigerant then flows downstream to the four-way valve 1070. In the winter mode, the four-way valve 1070 couples the second end 1078 of the heat exchange circuit 1074 to the accumulator circuit 1072 to return the refrigerant from the heat exchange circuit 1074 to the compressor 1060.

As shown in FIG. 10, a valve 1090, such as a solenoid valve, may be positioned within a recirculation bypass path 1091, which may be disposed downstream of the hot gas bypass circuit 1067 and the pass-through circuit 1069, but upstream from the four-way valve 1070. The recirculation bypass path 1091 connects to the regeneration air heat exchanger 954. When the valve 1090 is closed, refrigerant passes from either the pass-through circuit 1069 or the hot gas bypass circuit 1067 to the four-way valve 1070, as described above. However, when the valve 1090 is opened, refrigerant passes from either the pass-through circuit 1069 or the hot gas bypass circuit 1067 directly to the regeneration air heat exchanger 954. As explained below, the valve 1090 is opened during a regeneration air heat exchanger 954 defrost process.

Before explaining the defrost process, however, referring again to FIG. 9, during the summer mode of operation, the regeneration air 924 includes cool dehumidified air and the outside air 914 includes warm humidified air.

When the damper 913 is opened, the outside air 914 enters the inlet 910 of the supply air channel 906. The outside air 914 is channeled to the supply air side 934 of the energy recovery module 130. During this time, the preheater 931 and the humidifier 933 may be deactivated. Optionally, the preheater 931 and the humidifier 933 may be operated in a reverse mode such that the preheater 931 acts a precooler, while the humidifier 933 acts as a dehumidifier. Alternatively, the system 904 may not include the humidifier 933 and/or the preheater 931. In the supply air side 934 of the energy recovery module 930, heat and moisture are removed from the supply air 916 and transferred to the regeneration air 924 flowing through the regeneration air side 932 of the energy recovery module 930. The energy recovery module 930 generates cool dehumidified pre-conditioned outside air 944. The pre-conditioned outside air 944 flows downstream to the supply air heat exchanger 946. In the summer mode, the supply air heat exchanger 946 operates as an evaporator to cool the pre-conditioned outside air 944. The supply air heat exchanger 946 removes heat from the pre-conditioned outside air 944 and transfers the heat to the regeneration air heat exchanger 954. The supply air heat exchanger 946 generates cool dehumidified supply air 916 that is discharged into the space 918.

The regeneration air channel 908 receives the cool dehumidified regeneration air 924 from the space 918. The regeneration air 924 flows downstream to the regeneration air side 932 of the energy recovery module 930. The cool dehumidified regeneration air 924 receives heat and moisture from the regeneration air side 932 of the energy recovery module 930. The heat and moisture is transferred from the supply air side 934 of the energy recovery module 930 to heat and humidify the cool dehumidified regeneration air 924. The regeneration air side 932 of the energy recovery module 930 generates warm humidified pre-conditioned regeneration air 948. In the summer mode, the damper 956 may be opened so that the pre-conditioned regeneration air 948 is mixed with outside air 952 to generate mixed air 954. In other embodiments, the damper 956 may be modulated in the summer mode to control a refrigerant condensation temperature. The outside air 952 is added to the warm humidified pre-conditioned regeneration air 948 to control the refrigeration pressure in the refrigeration system 1002. In one embodiment, controlling the refrigeration system pressure lowers a condensation temperature to improve the efficiency of the heat pump system 904.

The mixed air 954 is channeled to the pre-processing module 950. In one embodiment, the mixed air 954 may bypass the pre-processing module 950. In one embodiment, the pre-processing module 950 and the regeneration air heat exchanger 954 may bypass the pre-processing module 950 during a controlled free cooling mode, wherein the refrigerant system 1002 is not operating. The pre-processing module 950 heats the mixed air 954 to generate the pre-heated air 952. The pre-heated air 952 is channeled downstream to the regeneration air heat exchanger 954. In the summer mode, the regeneration air heat exchanger 954 operates as a condenser to heat the pre-heated air 952 and generate warm exhaust air 926. The warm exhaust air 926 is discharged into the atmosphere. In an exemplary embodiment, the pre-processing module 950 heats the mixed air 954 to improve an efficiency of the regeneration air heat exchanger 954. Because the mixed air 954 is pre-heated by the pre-processing module 950, the regeneration air heat exchanger 954 requires a lower condensation temperature in the refrigeration system 1002. A lower condensation temperature improves the efficiency of the heat pump system 904.

Referring again to FIG. 10, in the summer mode, the bypass valve 1064 may be closed and the pre-processing valve 1068 may be entirely opened or modulated. The refrigerant in the compressor 1060 flows downstream to the pre-processing circuit 1062 and the pre-processing module 950. The pre-processing module 950 heats the pre-conditioned regeneration air 948 in the regeneration air channel 908 (shown in FIG. 9). Similarly, during the summer mode, the valve 1077 may be opened, while the valve 1071 may be closed so that refrigerant in the pre-processing circuit 1062 passes to the four-way valve 1070. Further, during the summer mode, the valve 1090 may be closed so that the refrigerant is not bypassed directly to the regeneration air heat exchanger 954. Accordingly, the refrigerant in the pre-processing module 950 flows downstream to the four-way valve 1070.

Referring to FIGS. 9 and 10, in the summer mode, the four-way valve 1070 couples the pre-processing circuit 1062 in fluid communication with the second end 1078 of the heat exchange circuit 1074, similar to as shown in FIG. 6. The refrigerant flow in the regeneration air heat exchanger 954 transfers heat to the pre-heated air 952. The refrigerant in the supply air heat exchanger 946 receives heat from the pre-conditioned outside air 944. The refrigerant then flows downstream to the four-way valve 1070. In the summer mode, the four-way valve 1070 couples the first end 1076 of the heat exchange circuit 174 to the accumulator circuit 1072 to return the refrigerant from the heat exchange circuit 1074 to the compressor 1060.

During the winter mode of operation, the regeneration air heat exchanger 954 may need to be defrosted. A control system 1092, such as a computer having a central processing unit, a thermostat/humidistat, or the like, may be operatively connected to the valves and dampers shown and described in FIGS. 9 and 10. The control system 1092 is configured to transition the heat pump system 904 between a heating mode and a defrost mode. The control system 1092 may be operatively connected to temperature and humidity sensors both within the heat pump system 904 and the refrigerant system, as well as outside. Based on detected temperature and humidity levels, the control system 1092 may selectively open and close dampers, activate and deactivate refrigerant flow, and the like.

As noted above, the accumulator 1061 may include a heater, such as a crankcase heater. It has been found that the crankcase heater increases suction pressure of the accumulator and, thereby, delays the formation of frost and improves heating performance. Thus, the crankcase heater may be activated when the saturation suction temperature is less than a particular temperature, such as 21° F. A defrost initiation temperature is detected by an operator, or a control system. The defrost initiation temperature may be 35° F., for example.

The supply air channel 906 includes a pre-processing segment 969 upstream from the energy recovery module 930 and a post-processing segment 973 downstream from the energy recovery module 930. The regeneration air channel 908 includes an upstream segment 975 upstream from the energy recovery module 930 and a downstream segment 971 downstream from the energy recovery module 930.

Once the defrost initiation temperature is detected, the operator or the control system 1092 deactivates the fans 915 and 919. Next, the dampers 913 and 917 are closed (the damper 956 is also closed). The dampers 957 and 959 may also be closed. During this time, the recirculation dampers 935 and 937 are opened in order to provide the recirculation loop 963 of exhaust air that travels along a defrost airflow path 967 that includes at least a portion of the pre-processing segment 969 of the supply air channel 906 and at least a portion of the downstream segment 971 of the regeneration air channel 908 (again, the additional closed damper 957 may be positioned within the supply air channel 906 just upstream from the energy recovery module 930 and another closed damper 959 may be positioned within the regeneration air channel 908 just downstream from the energy recovery module 930). After the dampers 913 and 917 are closed and the recirculation dampers 935 and 937 are opened, the valve 1090 is opened so that refrigerant may pass from the compressor 1060 to the regeneration heat exchanger 954. Moreover, the valve 1071 may be opened to allow refrigerant to pass through the hot gas reheat coil 1073 before passing to the regeneration heat exchanger 954. After a predetermined period of time, such as two or three minutes, the fan 915 may be reactivated in order to force the air through the recirculation loop 963. The preheater 931 and/or the humidifier 933 may also be activated to further heat and/or humidify the air within the recirculation loop 963. The heated air within the recirculation loop raises the temperature of the regeneration heat exchanger 954, which prevents frost from forming within or on the regeneration heat exchanger 954. Once the operator or the control system 1092 determines that the regeneration heat exchanger 954 is defrosted, the recirculation dampers 935 and 937 are closed, the dampers 913 and 917 are reopened, the valve 1090 is closed, the fan 919 may be reactivated, thereby returning the system 904 to a normal heating operation.

Figure 11:
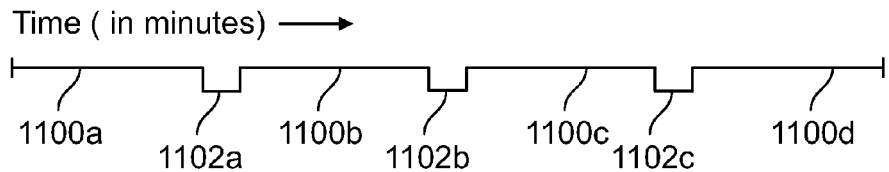
FIG. 11 illustrates a chart of heating and defrost cycles of a heat pump system, according to an embodiment.

FIG. 11 illustrates a chart of heating and defrost cycles of the heat pump system 904 (shown in FIG. 9), according to an embodiment. As shown in FIG. 11, the heat pump system 904 may be operated in a series of heating cycles 1100, in which the heat pump system 904 is used to heat and/or humidify the space 918, separated by a defrost cycles 1102, in which the heat pump system 904 is transitioned to defrost the regeneration air heat exchanger 954. For example, the heat pump system 904 may be operated for a first heating cycle 1100a for a predetermined period of time, such as forty to fifty minutes. After the predetermined period of time elapses, the heat pump system 904 transitions to a defrost cycle 1102a, for a lesser period of time, such as eight to ten minutes. After the defrost cycle 1102a period of time elapses, the heat pump system 904 transitions back to a heating cycle 1100b, and the process repeats through heating cycle 1100b, defrost cycle 1102b, heating cycle 1100c, defrost cycle 1102c, heating cycle 1100d, and so on.

The frequency of the defrost cycles 1102 may be minimized in order to maintain a comfortable temperature within an enclosed space. In one embodiment, the minimum defrost time may be 10% of a heating cycle, while the maximum defrost time may be 20% of a heating cycle. However, the defrost times may be greater or less than these examples. For example, each heating cycle 1100 may last for 20 minutes, while each defrost cycle 1102 may last for 1 minute. As another example, the heating cycle 1100 may last for 90 minutes, while each defrost cycle 1102 may last for 1-10 minutes.

Figure 12:
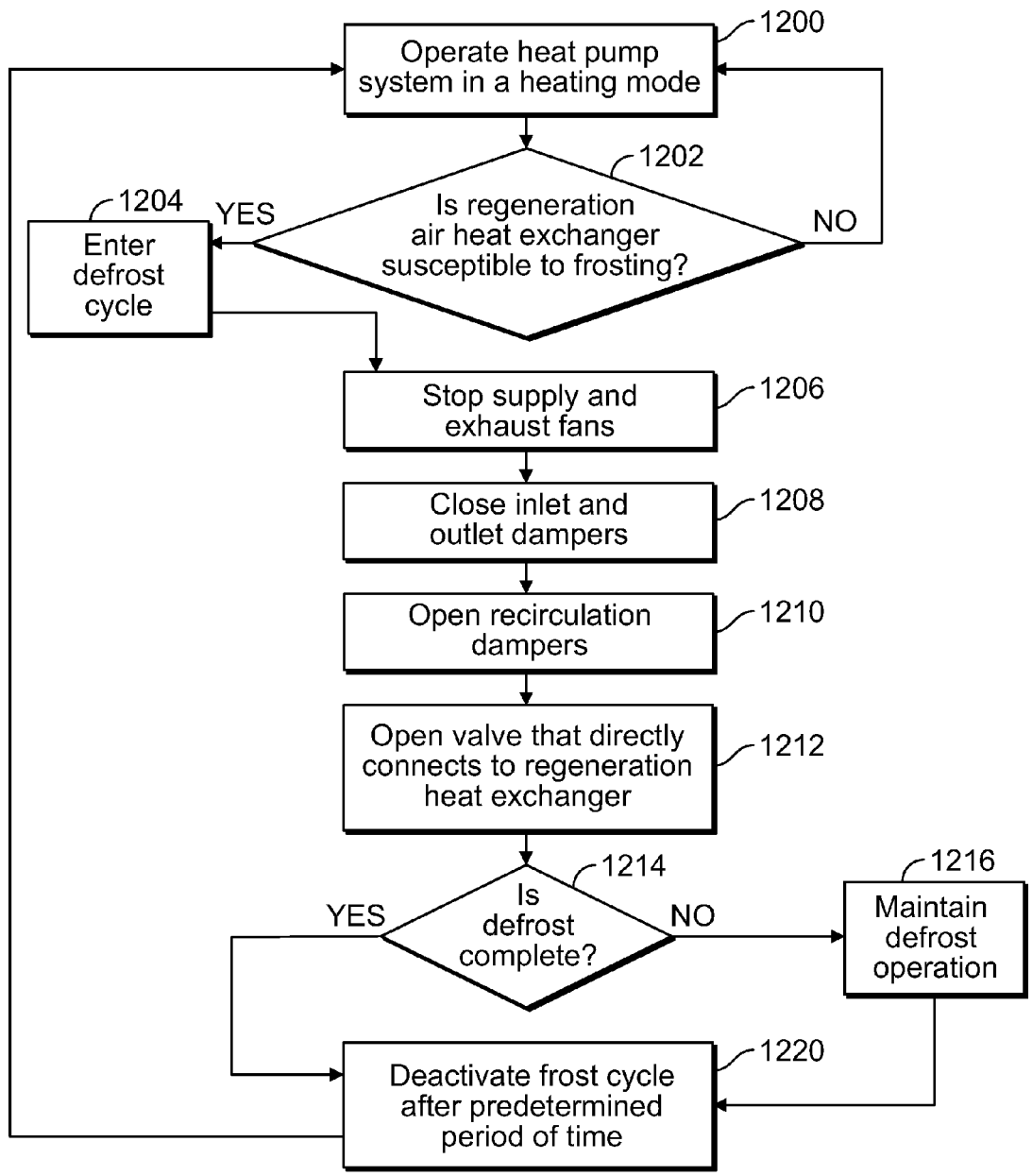
FIG. 12 illustrates a flow chart of a process of operating a heat pump system, according to an embodiment.

FIG. 12 illustrates a flow chart of a process of operating a heat pump system, according to an embodiment. At 1200, the heat pump system is operated in a heating mode in order to heat an enclosed space. A control system, such as a computer, digital thermostat, or the like, may be used to operate the heat pump system in the heating mode. At 1202, an operator or the control system determines whether the regeneration air heat exchanger, such as the regeneration air heat exchanger 954 shown in FIG. 9, is susceptible to frosting. The frosting threshold may be a predetermined outside temperature or temperature of the regeneration air heat exchanger, such as, for example, 35° F. If the regeneration air heat exchanger is not susceptible to frosting, the process returns to 1200. If, however, the regeneration air heat exchanger is susceptible to frosting, the heat pump system enters a defrost cycle at 1204. During the defrost cycle, the supply and exhaust fans, such as fans 915 and 919 shown in FIG. 9, are deactivated at 1206. Then, at 1208, the inlet and outlet dampers, such as the dampers 913 and 917 shown in FIG. 9, are closed. At 1210, the recirculation dampers, such as the dampers 935 and 937 shown in FIG. 9, are opened, to provide an air recirculation loop between the supply air channel and the regeneration air channel. Next, at 1212, a valve, such as the valve 1090 shown in FIG. 10, is opened, thereby directly connecting the regeneration heat exchanger to a refrigerant line downstream of the pre-processing module 950, as shown in FIG. 10. After a period of time, the supply fan 915 may be activated to circulate the warm air 924 from the space to further improve the defrosting effect. At 1214, the operator or the control system 1214 determines if the defrost process is complete. If not, then at 1216, the current defrost operation is maintained. If, however, the defrost rate is finished, the process proceeds to 1220, which deactivates the frost cycle after a predetermined period of time. Optionally, the defrost process may continue until the regeneration air heat exchanger reaches a desired temperature in which frost cannot form therein or thereon. After 1220, the process returns to 1200.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A heat pump system for conditioning air in a space, the system comprising:
    a supply air channel configured to receive air and discharge supply air into the space, wherein the supply air channel has a supply air inlet and supply air outlet;
    a regeneration air channel configured to receive regeneration air from the space and discharge exhaust air, the regeneration air channel and the supply air channel separated by a partition, wherein the regeneration air channel has a regeneration air inlet and a regeneration air outlet;
    a regeneration air heat exchanger positioned in the regeneration air channel, the regeneration air heat exchanger is configured to remove heat from the regeneration air during a heating cycle, the regeneration air heat exchanger discharging exhaust air; and
    at least one recirculation damper positioned within the partition, wherein the at least one recirculation damper is configured to be opened during a defrost cycle to provide a recirculation loop of regeneration air that recirculates through a defrost airflow path that includes at least a portion of a pre-processing segment of the supply air channel and at least a portion of a downstream segment of the regeneration air channel, wherein the recirculation loop of exhaust air removes frost from the regeneration air heat exchanger during the defrost cycle.

2. The heat pump system of claim 1, wherein the at least one recirculation damper comprises first and second recirculation dampers.

3. The heat pump system of claim 1, further comprising:
    an inlet damper disposed within the supply air channel proximate the supply inlet, wherein the inlet damper is closed during the defrost cycle and open during the heating cycle; and
    an outlet damper disposed within the regeneration air channel proximate the regeneration outlet, wherein the outlet damper is closed during the defrost cycle and open during the heating cycle.

4. The heat pump system of claim 1, further comprising a preheater disposed within the supply air channel, wherein the recirculation loop of regeneration air passes through the preheater during the defrost cycle.

5. The heat pump system of claim 1, further comprising a humidifier disposed within the supply air channel, wherein the recirculation loop of regeneration air passes through the humidifier during the defrost cycle.

6. The heat pump system of claim 1, further comprising an energy recovery module having a supply air side positioned in the supply air channel and a regeneration air side positioned in the regeneration air channel, the regeneration air side of the energy recovery module being configured to remove heat and moisture from the regeneration air in the regeneration air channel during the heating cycle.

7. The heat pump system of claim 6, further comprising a pre-processing module positioned in the regeneration air channel between the regeneration air side of the energy recovery module and the regeneration air heat exchanger, the pre-processing module is configured to heat the regeneration air from the energy recovery module during the heating cycle to prevent frost from forming on the regeneration air heat exchanger.

8. The heat pump system of claim 1 further comprising a compressor configured to condition a refrigerant flowing through the regeneration air heat exchanger.

9. The heat pump system of claim 8, further comprising a head pressure control valve operatively connected to the compressor, wherein the head pressure control valve is configured to be engaged to ensure proper functioning of the compressor.

10. The heat pump system of claim 1, further comprising a refrigerant path connected to the regeneration air heat exchanger, wherein a valve is disposed within the refrigerant path, and wherein the valve is closed during the heating cycle and open during the defrost cycle.

11. The heat pump system of claim 10, wherein the valve comprises a solenoid valve.

12. The heat pump system of claim 1, further comprising a hot gas reheat coil connected to the regeneration air heat exchanger through a refrigerant path.

13. The heat pump system of claim 1, further comprising:
    at least one supply air fan within the supply air channel; and
    at least one regeneration air fan within the regeneration air channel.

14. The heat pump system of claim 1, further comprising a control system configured to selectively operate the heat pump system between the heating cycle and the defrost cycle.

15. The heat pump system of claim 14, wherein the heating cycle occurs over a first period of time, and wherein the defrost cycle occurs over a second period of time, wherein the second period of time is shorter than the first period of time.

16. The heat pump system of claim 15, wherein the second period of time is between 10-20% the first period of time.

17. The heat pump system of claim 1, wherein an entirety of the defrost airflow path is contained within the heat pump system.

* * * * *